United States Patent
Suzuki et al.

(10) Patent No.: US 9,819,884 B2
(45) Date of Patent: Nov. 14, 2017

(54) IMAGING DEVICE

(71) Applicant: RENESAS ELECTRONICS CORPORATION, Tokyo (JP)

(72) Inventors: Atsushi Suzuki, Tokyo (JP); Yasutoshi Aibara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/453,755

(22) Filed: Mar. 8, 2017

(65) Prior Publication Data

US 2017/0180669 A1 Jun. 22, 2017

Related U.S. Application Data

(63) Continuation of application No. 14/541,128, filed on Nov. 13, 2014, now Pat. No. 9,628,736.

(30) Foreign Application Priority Data

Nov. 25, 2013 (JP) .................................. 2013-242956

(51) Int. Cl.
*H04N 5/3745* (2011.01)
*H04N 5/355* (2011.01)
*H04N 5/363* (2011.01)

(52) U.S. Cl.
CPC ....... *H04N 5/37452* (2013.01); *H04N 5/3559* (2013.01); *H04N 5/363* (2013.01)

(58) Field of Classification Search
CPC ............. H04N 5/23241; H04N 5/2355; H04N 5/3559; H04N 5/3575; H04N 5/363; H04N 5/3745; H04N 5/37457; H04N 5/378

(Continued)

(56) References Cited

U.S. PATENT DOCUMENTS

| 5,949,483 | A | 9/1999 | Fossum et al. |
| 7,800,673 | B2 | 9/2010 | Sugawa et al. |

(Continued)

FOREIGN PATENT DOCUMENTS

| JP | 2005-328493 A | 11/2005 |
| JP | 2006-217410 A | 8/2006 |
| JP | 2010-212769 A | 9/2010 |

OTHER PUBLICATIONS

U.S. Notice of Allowance dated Dec. 13, 2016 issued in U.S. Appl. No. 14/541,128.

(Continued)

*Primary Examiner* — Lin Ye
*Assistant Examiner* — Chriss Yoder, III
(74) *Attorney, Agent, or Firm* — McDermott Will & Emery LLP

(57) ABSTRACT

An imaging device is provided which can secure the dynamic range of a COMS imaging sensor, by storing a charge overflowing from a floating diffusion in a storage capacitance element and suppressing the increase of a pixel area which occurs if the storage capacitance element is formed by a MOS capacitor. The imaging device includes plural pixel circuits arranged in the row direction and the column direction, and plural storage capacitance lines arranged in the row direction and extending in the column direction. Each of the storage capacitance lines is coupled to the pixel circuits arranged in the same column. The pixel circuit includes a first photoelectric conversion element which stores a charge generated by being subjected to light, a floating diffusion to which the charge stored in the first photoelectric conversion element is transferred, and a first switching transistor coupling the floating diffusion and the storage capacitance line.

7 Claims, 22 Drawing Sheets

(58) Field of Classification Search
USPC ...... 348/294, 302, 308; 250/208.1; 257/291, 257/292
See application file for complete search history.

(56) References Cited

U.S. PATENT DOCUMENTS

| | | |
|---|---|---|
| 8,441,565 B2 | 5/2013 | Suzuki et al. |
| 8,735,795 B2 * | 5/2014 | Qiao .................... H04N 5/2351 250/208.1 |
| 2004/0246354 A1 | 12/2004 | Yang et al. |
| 2014/0022427 A1 | 1/2014 | Goto et al. |

OTHER PUBLICATIONS

U.S. non-Final Office Action dated Jul. 5, 2016 issued in U.S. Appl. No. 14/541,128.

K. Aizawa, et al., "CMOS image sensor," Essential technology series 9 of image information and television engineers, Corona Publishing Co., Ltd., pp. 47, 159, and 184 (no date).

N. Akahane, et al., "A Sensitivity and Linearity Improvement of a 100-dB Dynamic Range CMOS Image Sensor Using Lateral Overflow Integration Capacitor," IEEE Journal of Solid-State Circuits, vol. 41, No. 4, Apr. 2006, pp. 851-858 (with English translation).

* cited by examiner

NOTE: MARK "↑" INDICATES VDD

NOTE: MARK "↑" INDICATES VDD

NOTE: MARK "↑" INDICATES VDD

NOTE: MARK "↑" INDICATES VDD

IMAGING DEVICE

CROSS-REFERENCE TO RELATED APPLICATIONS

This application is a continuation patent application of U.S. patent application Ser. No. 14/541,128 filed on Nov. 13, 2014 which in turn claims the benefit of Japanese Patent Application No. 2013-242956 filed on Nov. 25, 2013 including the specification, drawings and Abstract is incorporated herein by reference in their entirety.

BACKGROUND

The present invention relates to an imaging device, for example, to an imaging device of a CMOS (Complementary Metal-Oxide Semiconductor) type.

A CMOS imaging device, or the so-called COMS imaging sensor, has spread widely in the field of a digital camera. When expanding the application of the COMS imaging sensor to a vehicle-mounted camera or a surveillance camera, enlargement of the dynamic range and also enhancement of the operation speed are required.

Patent Document 1 and Patent Document 2 both disclose a solid-state imaging device in which pixels are integrated in the shape of an array. Each of the pixels is configured with a photodiode which generates and stores a charge when subjected to light, a floating diffusion to which the charge stored in the photodiode is transferred, and a storage capacitance element which stores a charge overflowing from the floating diffusion. Patent Document 3 discloses an imaging device in which pixels are integrated in the shape of an array. In each of the pixels, four photodiodes are coupled to a gate of an amplification transistor via four transfer transistors, respectively, and the output of the amplification transistor is fed externally via a select transistor.

Non Patent Literature 1 discloses a technology to enlarge the dynamic range and a configuration of an image sensor in which a single slope integrating A/D converter is integrated.

Non Patent Literature 2 discloses a pixel circuit having a lateral overflow integration capacitor (LOFIC) structure.

PATENT LITERATURE (Patent Literature 1) Japanese Unexamined Patent Application Publication No. 2005-328493

(Patent Literature 2) Japanese Unexamined Patent Application Publication No. 2006-217410

(Patent Literature 3) Japanese Unexamined Patent Application Publication No. 2010-212769

Non Patent Literature (Non Patent Literature 1) "COMS image sensor"; Essential technology series 9 of image information and television engineers, compiled by Kiyoharu Aizawa and Takayuki Hamamoto, edited by Institute of Image Information and Television Engineers, published by Corona Publishing Co., Ltd., pp. 47, 159, and 174.

(Non Patent Literature 2) "A Sensitivity and Linearity Improvement of a 100-dB Dynamic Range CMOS Image Sensor Using a Lateral Overflow Integration Capacitor"; Nana Akahane, Shigetoshi Sugawa, Satoru Adachi, Kazuya Mori, Toshiyuki Ishiuchi, and Koichi Mizobuchi, IEEE JOURNAL SOLID-STATE CIRCUITS, Vol. 41, No. 4, April 2006, pp. 851-858.

SUMMARY

A pixel of a COMS imaging sensor has secured the dynamic range, by transferring a charge generated by a photodiode to a floating diffusion and by storing a charge overflowing from the floating diffusion in a storage capacitance element. When the capacity of the floating diffusion is set small in order to improve the sensitivity on the low illuminance side, clipped whites will appear on the high illuminance side. On the other hand, when a storage capacitance element is formed in order to suppress the appearance of clipped whites on the high illuminance side, the pixel area will increase and it will become difficult to realize a large number of pixels. As in the pixel according to Patent Literature 1 or Patent Literature 2, when a MOS capacitor is formed in a semiconductor substrate or over a semiconductor substrate as a storage capacitance element, it becomes difficult to secure the area of a photodiode. Furthermore, there is a disadvantage that high-k material and a stacked capacitor push up the cost. The other issues and new features of the present invention will become clear from the description of the present specification and the accompanying drawings.

An imaging device according to one embodiment is configured with plural pixel circuits arranged in the row direction and the column direction and plural storage capacitance lines arranged in the row direction and extending in the column direction. The storage capacitance lines are coupled to the pixel circuits arranged in the same column. The pixel circuit includes a first photoelectric conversion element which stores a charge generated by being subjected to light, a floating diffusion to which the charge stored in the first photoelectric conversion element is transferred, and a first switching transistor which couples the floating diffusion and the storage capacitance line.

DETAILED DESCRIPTION

Figure 1:
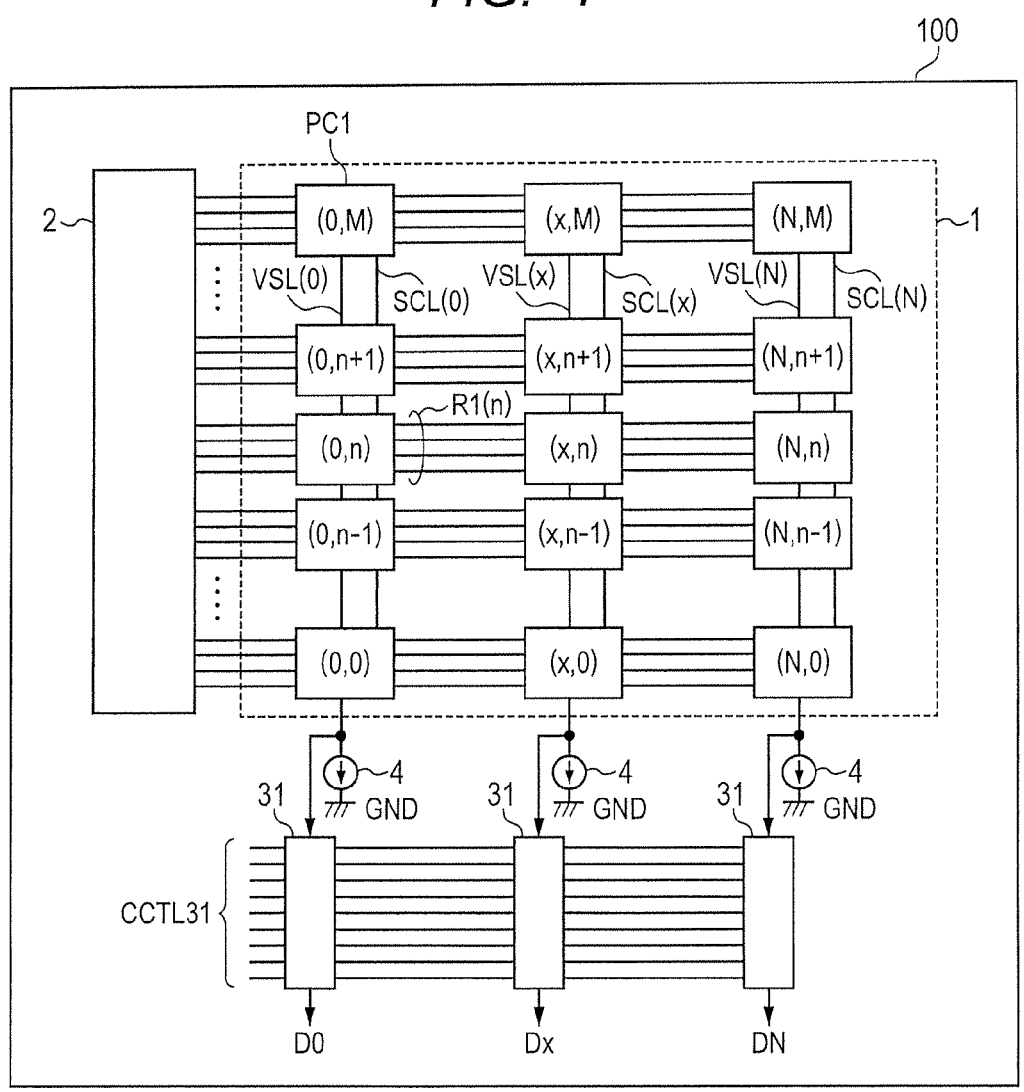
FIG. 1 is a block diagram illustrating a configuration of an imaging device according to Embodiment 1.

Hereinafter, the embodiments are explained with reference to the drawings. When the number of elements, quantity, etc. are referred to in the explanation of the embodiments, it is not always restricted to the number of elements, quantity, etc., unless otherwise described in particular. In the drawings of the embodiments, the same reference symbol and the same reference number shall express the same or corresponding part. In the explanation of the embodiments, the repeated explanation will not be made in some cases to the same or corresponding part to which the same reference symbol is attached.

Embodiment 1

FIG. 1 is a block diagram illustrating a configuration of an imaging device 100 according to Embodiment 1.

The imaging device 100 is configured with a pixel array 1, a vertical scanning circuit 2, a column circuit 31, and a constant current circuit 4.

The pixel array 1 includes a pixel circuit PC1, a vertical signal line VSL, and a storage capacitance line SCL. The pixel circuit PC1 is arranged in the shape of an array of (N+1) pieces in the row direction (the left and right direction in FIG. 1) and (M+1) pieces in the column direction (the up and down direction in FIG. 1). For example, the symbol (x, n) attached to a rectangle pattern indicating a pixel circuit PC1 expresses a pixel circuit located at the xth row and nth column, and the pixel circuit PC1 concerned is expressed as a PC1(x, n) hereinafter. When the row number and the column number are not specified, the pixel circuit is only expressed as a pixel circuit PC1.

The vertical signal line VSL extends in the column direction and (N+1) vertical signal lines are arranged in the row direction, with the same number as the number of the pixel circuits PC1. Hereinafter, the vertical signal line VSL coupled to the pixel circuit PC1(x, n) is expressed as a vertical signal line VSL(x). The storage capacitance line SCL extends in the column direction and (N+1) storage capacitance lines are arranged in the row direction, with the same number as the number of the pixel circuits PC1. Hereinafter, the storage capacitance line SCL coupled to the pixel circuit PC1(x, n) is expressed as a storage capacitance line SCL(x). When there is no necessity of reference specifying the row number x, they are simply expressed as a vertical signal line VSL and a storage capacitance line SCL. A bias current is applied to each vertical signal line VSL by the constant current circuit 4.

The vertical scanning circuit 2 outputs a row selection signal group R1(n) which selects one row of the pixel circuit PC1 from the plural rows of the pixel circuit PC1. The row selection signal group R1(n) selects concurrently the pixel circuit PC1(0, n) to the pixel circuit PC1(N, n) arranged at the nth row, among (M+1) rows of pixel circuits PC1 arranged from the 0th row to the Mth row. (N+1) column circuits 31 are arranged in the row direction. Each column circuit 31 converts an analog signal outputted by the corresponding vertical signal line VSL(x) into a digital signal Dx, and outputs the digital signal Dx. The A/D (analog/digital) conversion in each column circuit 31 is concurrently controlled by a column circuit control signal group CCTL31.

Figure 2:
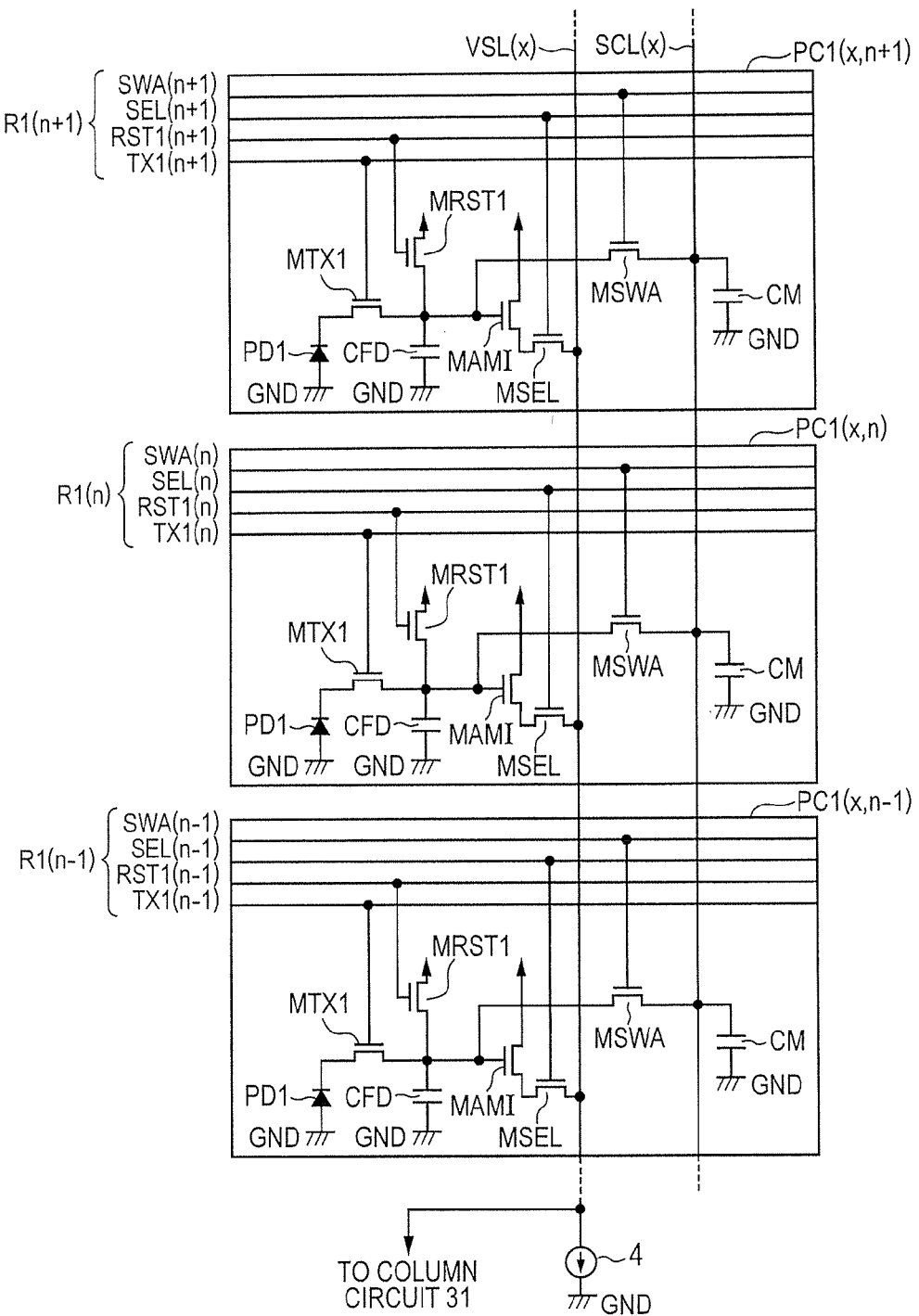
FIG. 2 is a circuit diagram of a pixel circuit illustrated in FIG. 1.

FIG. 2 is a circuit diagram of a pixel circuit PC1 illustrated in FIG. 1.

(Configuration) The pixel circuit PC1 is configured with a photoelectric conversion element PD1, a transfer transistor MTX1, a floating diffusion capacitor CFD, a reset transistor MRST1, an amplification transistor MAMI, a select transistor MSEL, a first switching transistor MSWA, and a storage line capacitor CM. A transfer transistor control signal TX1, a reset transistor control signal RST1, a select transistor control signal SEL, and a first switching control signal SWA are applied to respective gates of the transfer transistor MTX1, the reset transistor MRST1, the select transistor MSEL, and the first switching transistor MSWA. The above-described row selection signal group R1(n) is a bunch of these four control signals.

The photoelectric conversion element PD1 is an ordinary photodiode formed over a semiconductor substrate (not shown). The power supply voltage GND is applied to an anode of the photoelectric conversion element PD1. A cathode of the photoelectric conversion element PD1 is coupled to one of a source and a drain of the transfer transistor MTX1. The other of the source and the drain of the transfer transistor MTX1 is coupled to a drain of the reset transistor MRST1, and to one of a source and a drain of the first switching transistor MSWA. The power supply voltage VDD is applied to a source of the reset transistor MRST1. The other of the source and the drain of the first switching transistor MSWA is coupled to a storage capacitance line SCL. A source and a drain of the select transistor MSEL are coupled to a drain of the amplification transistor MAMI and a vertical signal line VSL, respectively.

A storage line capacitor CM included in each pixel circuit PC1 corresponds to the wiring capacitance of the storage capacitance line SCL(x) passing through an area in which each pixel circuit PC1 is formed. That is, the value of the storage line capacitor CM corresponds to the value of the wiring capacitance of the entire storage capacitance line SCL(x) divided by the number (M+1) of the pixel circuits PC1 arranged in the column direction.

One terminal of the floating diffusion capacitor CFD is coupled to the other of the source and the drain of the transfer transistor MTX1, and the other terminal of the floating diffusion capacitor CFD is applied with the power supply voltage GND. The floating diffusion capacitor CFD is an equivalent capacity of the floating diffusion (floating area) which converts a photo charge into a voltage. The floating diffusion capacitor CFD includes the parasitic capacitance of an impurity diffusion region and the parasitic capacitance of a wiring coupled to the impurity diffusion region. The impurity diffusion region is formed individually or separately to form the other of the source and the drain of the transfer transistor MTX1, the drain of the reset transistor MRST1, and one of the source and the drain of the first switching transistor MSWA.

(The operation) Upon being set in a conductive state by the reset transistor control signal RST1, the reset transistor MRST1 resets the floating diffusion capacitor CFD. At this time, the storage line capacitor CM is also concurrently reset by having set the first switching transistor MSWA in a conductive state by the first switching control signal SWA.

A photo charge stored in the photoelectric conversion element PD1 is transferred to the floating diffusion via the transfer transistor MTX1 set in a conductive state, and the floating diffusion capacitor CFD is charged. A charge overflowing from the floating diffusion is stored in the storage line capacitor CM via the first switching transistor MSWA set in a conductive state. The amplification transistor MAMI amplifies the voltage of the floating diffusion capacitor CFD, and outputs it to the vertical signal line VSL(x) via the select transistor MSEL.

Figure 3:
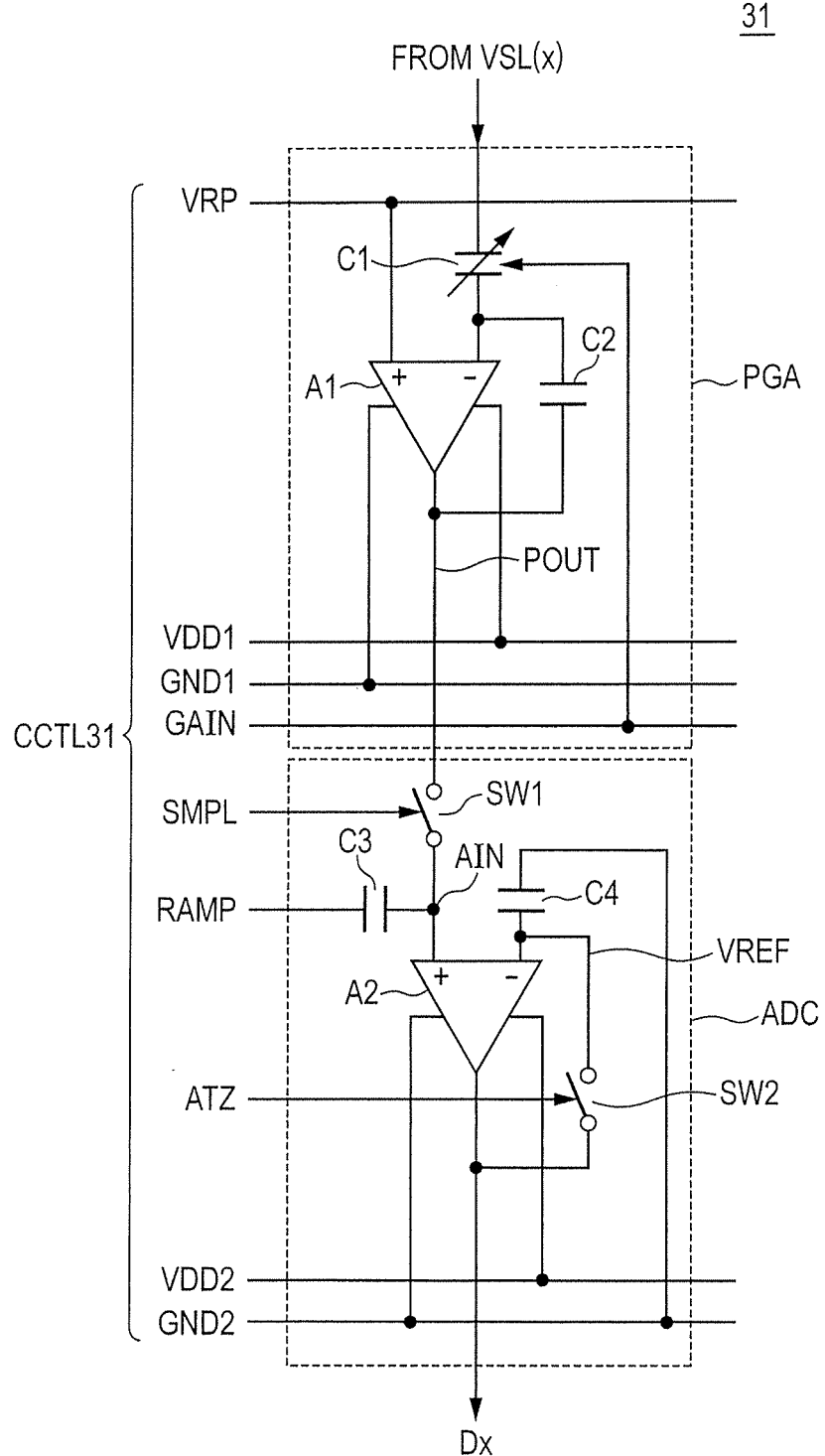
FIG. 3 is a circuit diagram of a column circuit illustrated in FIG. 1.

FIG. 3 is a circuit diagram of the column circuit 31 illustrated in FIG. 1. The column circuit 31 converts an analog signal which the pixel circuit PC1(x, n) outputs via the vertical signal line VSL(x), into a digital signal Dx, and outputs the digital signal Dx. The column circuit 31 is configured with a programmable gain amplifier PGA and an A/D converter circuit ADC. The A/D converter circuit ADC is a single slope integrating A/D converter circuit.

(The configuration and operation of the programmable gain amplifier PGA) The programmable gain amplifier PGA includes an input capacitor C1, a feedback capacitor C2, and a differential amplifier A1. The power supply voltage VDD1 and the power supply voltage GND1 are applied to the differential amplifier A1. A PGA reference voltage VRP is applied to a positive input terminal of the differential amplifier A1. One end of the input capacitor C1 is coupled to the vertical signal line VSL, and the other end of the input capacitor C1 is coupled to a negative input terminal of the differential amplifier A1.

The gain of the differential amplifier A1 is determined by the ratio of the value of the input capacitor C1 to the value of the feedback capacitor C2. The output signal of the pixel circuit PC1 applied to the one end of the input capacitor C1 is amplified by the differential amplifier A1, and is outputted to the A/D converter circuit ADC as a PGA output signal POUT. It is also preferable to perform the gain adjustment of the differential amplifier A1 by changing the value of the feedback capacitor C2 by the PGA gain setting signal GAIN, instead of changing the value of the input capacitor C1 by the PGA gain setting signal GAIN. The gain of the differential amplifier A1 is generally set up by a DSP (digital signal processor) coupled in the latter stage of the column circuit 31, based on the data of one frame period (refer to FIG. 4) outputted earlier.

(The configuration and operation of the A/D converter circuit ADC) The A/D converter circuit ADC includes a capacitor C3, a capacitor C4, a comparator A2, a switch SW1, and a switch SW2. The power supply voltage VDD2 and the power supply voltage GND2 are applied to the comparator A2.

A PGA output signal POUT is applied to a positive input terminal AIN of the comparator A2 via the switch SW1. The conductive state of the switch SW1 is controlled by a sampling signal SMPL. Furthermore, one end of the capacitor C3 is coupled to the positive input terminal AIN of the comparator A2, and a ramp signal RAMP is applied to the other end of the capacitor C3.

One end of the capacitor C4 is coupled to a negative input terminal of the comparator A2, and the power supply voltage GND2 is applied to the other end of the capacitor C4. Furthermore, the output of the comparator A2 is applied to the negative input terminal of the comparator A2 via the switch SW2. The conductive state of the switch SW2 is controlled by an auto-zero signal ATZ. Before applying the PGA output signal POUT to the positive input terminal AIN of the comparator A2, the switch SW2 is set in a conductive state by the auto-zero signal ATZ to set a reference voltage to the negative input terminal of the comparator A2. Thereby, the offset of the A/D converter circuit ADC is removed.

The switch SW1 is set in a conductive state for a predetermined time after the offset of the A/D converter circuit ADC is removed, and a charge corresponding to the voltage of the PGA output signal POUT is stored at the end of the capacitor C3 currently coupled to the positive input terminal AIN of the comparator A2. At this period, the voltage of the ramp signal RAMP applied to the other end of the capacitor C3 is maintained on a prescribed level. Subsequently, the switch SW1 is set in a non-conductive state, the PGA output POUT is shifted to the high potential side by the ramp signal RAMP, and it is swept with a certain gradient. When the voltage of the PGA output signal POUT shifted to the high potential side by the ramp signal RAMP becomes equal to the reference voltage set at the negative input terminal of the comparator A2, the logical level of the output signal Dx of the A/D converter circuit ADC is inverted.

By the above processing, the A/D converter circuit ADC converts the PGA output signal POUT into a pulse shape. The pulse shape is generated from the time when the PGA output POUT is shifted to the high potential side by the ramp signal RAMP to the time when the PGA output POUT shifted to the high potential side becomes equal to the reference voltage. The time period when the pulse shape concerned is generated is measured with a counter (not shown in FIG. 3) and the count value is held; accordingly, the signal which the pixel circuit PC1 outputs is converted into a digital value.

Figure 4:
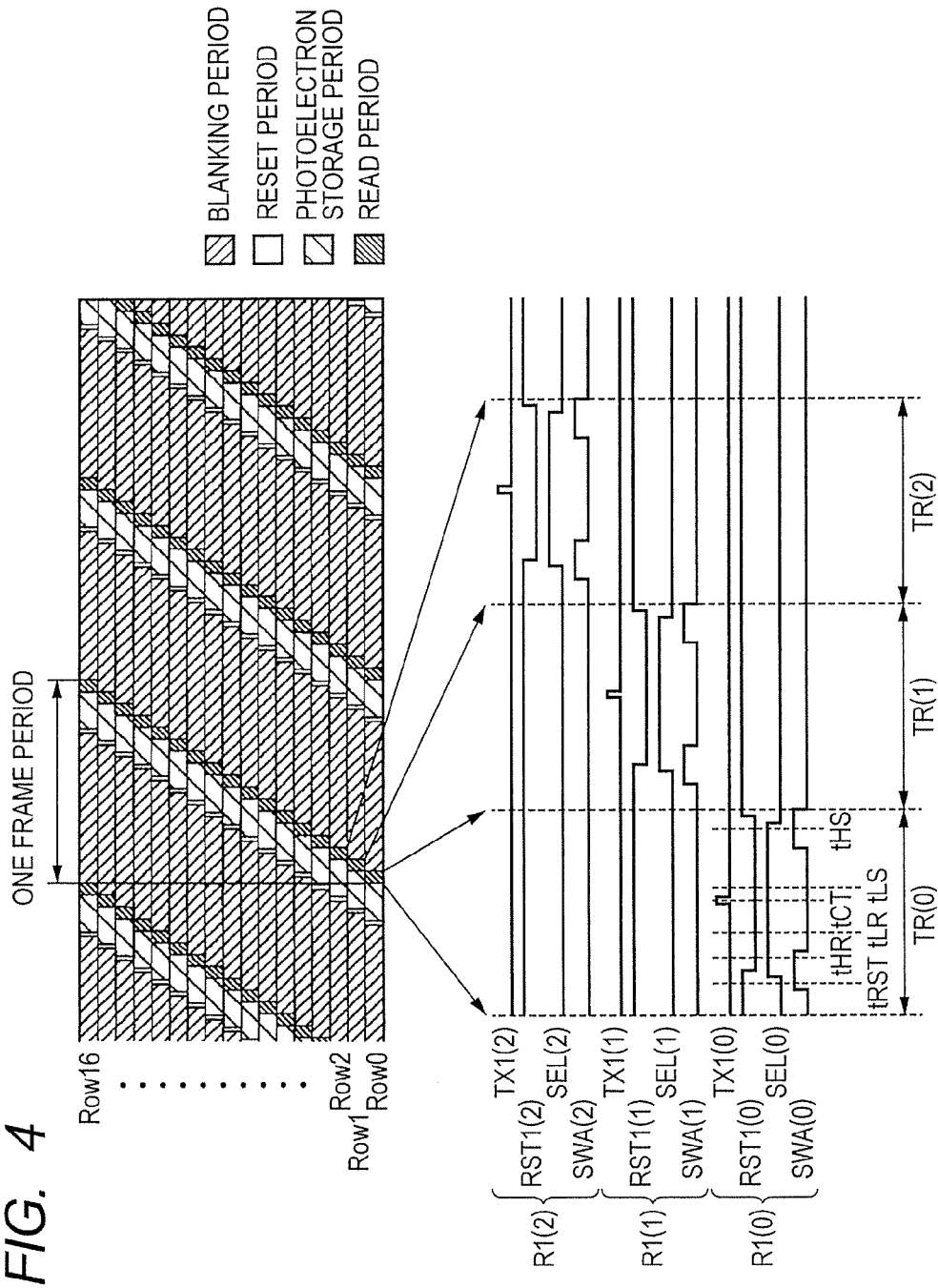
FIG. 4 is a timing chart explaining the read operation of the pixel circuit illustrated in FIG. 2.

FIG. 4 is a timing chart explaining the read operation of the pixel circuit PC1 illustrated in FIG. 2. The timing chart of FIG. 4 is explained referring to FIG. 2. FIG. 4 illustrates the timing chart in the case of reading the data of the pixel circuit PC1 in a rolling shutter system with a single exposure. For the sake of simplification of explanation, it is assumed that as for the pixel array 1 (refer to FIG. 1), the pixel circuits PC1 arranged (N+1) pieces per row are arranged in total of 17 rows from the 0th row (Row 0) to the 16th row (Row 16).

As shown in the timing chart at the upper part of FIG. 4, one frame period spans from the data read start time of the pixel circuit PC1 arranged at the 0th row (Row 0) to the data read completion time of the pixel circuit PC1 arranged at the 16th row (Row 16). At each row, a reset period and a photoelectron storage period corresponding to the exposure time of the photoelectric conversion element PD1 arranged at each row are set up before the read period of the pixel circuit PC1.

As shown in the waveform chart at the lower part of FIG. 4, at each read period starting after the end of the photoelectron storage period, each row of the pixel circuit PC1 is sequentially selected based on the row selection signal group R1 outputted by the vertical scanning circuit 2.

At a read period TR(0), the vertical scanning circuit 2 selects concurrently the pixel circuit PC1(0, 0) to the pixel circuit PC1(N, 0) arranged at the 0th row (Row 0) based on each control signal included in the row selection signal group R1(0). The output data of each pixel circuit PC1 arranged at the 0th row is inputted into each corresponding column circuit 31 via each pixel circuit PC1 and the vertical signal line VSL coupled thereto, respectively. Similarly in the followings, at each of the read periods TR(1)-TR(16), the data of each pixel circuit PC1 arranged at the 1st row to the 16th row is read, respectively.

Hereinafter, the control operation of the pixel circuit PC1 by the row selection signal group R1(0) is explained in detail.

(Reset of the floating diffusion capacitor CFD and the storage line capacitor CM) At time tRST, in response to the first switching control signal SWA set at a high level, the first switching transistor MSWA is set in a conductive state, and the floating diffusion capacitor CFD and the storage line capacitor CM are coupled in parallel. Furthermore, in response to the reset transistor control signal RST1 set at a high level, the reset transistor MRST1 is set in a conductive state, and the residual charge of the floating diffusion capacitor CFD and the storage line capacitor CM are discharged (reset). At this time, the transfer transistor MTX1 and the select transistor MSEL are set in a non-conductive state, on the basis of the transfer transistor control signal TX1 and the select transistor control signal SEL both set in a low level.

As illustrated in FIG. 4, at time tRST, in response to the first switching control signal SWA set at a low level, the first switching transistor MSWA included in the pixel circuit PC1 arranged at other non-selected rows is set in a non-conductive state. That is, the storage capacitance line SCL(x) is coupled to the first switching transistor MSWA included in the pixel circuit PC1(x, 0) arranged at the 0th row, however, the storage capacitance line SCL(x) is not coupled to the first switching transistor MSWA included in the pixel circuit PC1 arranged at other rows set as a non-selected row, such as the pixel circuit PC1(x, 1) arranged at the 1st row. Consequently, the reset transistor MRST1 included in the pixel circuit PC1(x, 0) arranged at the 0th row resets the floating diffusion capacitor CFD of the pixel circuit PC1(x, 0) and the storage line capacitor of the entire storage capacitance line SCL(x).

On the other hand, the logical level of the reset transistor control signal RST1 of the non-selected row is maintained at a high level over the read period TR(0). Consequently, the reset transistor MRST1 set in a conductive state maintains the reset of the floating diffusion capacitor CFD included in each pixel circuit PC1 arranged at the non-selected row.

(Read of a high-illuminance reset level) Between time tRST and time tHR, the logical level of the reset transistor control signal RST1(0) is inverted from a high level to a low level, and the reset by the reset transistor MRST1 included in the pixel circuit PC1 arranged at the 0th row as the selected row is released. Originating in this reset release, a charge as a cause for a reset noise is stored in the floating diffusion capacitor CFD and the storage line capacitor CM which are coupled in parallel by the first switching transistor MSWA. Hereinafter, this reset noise is also described as a "high-illuminance reset noise."

As described above, the storage line capacitor CM included in the pixel circuit PC1 arranged at the non-selected row is also coupled in parallel to the storage line capacitor CM included in the pixel circuit PC1 arranged at the 0th row as the selected row. Therefore, a charge as a cause for the reset noise is distributed to the floating diffusion capacitor CFD and 17 storage line capacitors CM in total.

Furthermore, before time tHR, the logical level of the select transistor control signal SEL(0) is also inverted from a low level to a high level, and the select transistor MSEL is set in a conductive state. The high-illuminance reset noise is amplified by the amplification transistor MAMI, and is inputted into the column circuit 31 via the select transistor MSEL and the vertical signal line VSL.

At time tHR, the programmable gain amplifier PGA included in the column circuit 31 outputs the high-illuminance reset level, generated by amplifying the high-illuminance reset noise outputted by the amplification transistor MAMI, as the PGA output signal POUT.

(Read of a low-illuminance reset level) Before time tLR, the logical level of the first switching control signal SWA(0) is inverted from a high level to a low level, and the first switching transistor MSWA is set in a non-conductive state. As a result, the floating diffusion capacitor CFD and the storage line capacitor CM which have been coupled in parallel are separated. The reset noise arising from this floating diffusion capacitor CFD is also described as a "low-illuminance reset noise." The low-illuminance reset noise is amplified by the amplification transistor MAMI, and is inputted into the column circuit 31 via the select transistor MSEL and the vertical signal line VSL.

At time tLR, the programmable gain amplifier PGA included in the column circuit 31 outputs the low-illuminance reset level, generated by amplifying the low-illuminance reset noise outputted by the amplification transistor MAMI, as the PGA output signal POUT.

(Photo charge transfer) At time tCT, the transfer transistor control signal TX1(0) set at a low level generates a one shot pulse with a prescribed width. At this time, other control signals included in the row selection signal group R1(0) hold the logical level at time tLR. Consequently, over the time when the transfer transistor control signal TX1(0) is set at a high level, the photo charge stored in the photoelectric conversion element PD1 is transferred to the floating diffusion capacitor CFD. The photo charge is stored only in the floating diffusion capacitor CFD at the time of the low illuminance. On the other hand, at the time of the high illuminance, the photo charge is stored in the floating diffusion capacitor CFD, and a charge overflowing from the floating diffusion capacitor CFD is stored in the storage line capacitor CM.

(Read of a low-illuminance signal level) After the end of a one shot pulse generated at time tCT, the floating diffusion capacitor CFD stores a mixture of the charge as a cause for the low-illuminance reset noise and the charge transferred from the photoelectric conversion element PD1. The amplification transistor MAMI amplifies the voltage of the floating diffusion capacitor CFD (hereinafter also described as a "low-illuminance mixed signal"), and outputs it to the column circuit 31 via the select transistor MSEL and the vertical signal line VSL.

At time tLS, the programmable gain amplifier PGA included in the column circuit 31 outputs the low-illuminance signal level, generated by amplifying the low-illuminance mixed signal outputted by the amplification transistor MAMI, as the PGA output signal POUT. When the photoelectric conversion element PD1 is subjected to the light of a high illuminance, the low-illuminance signal level outputted at time tLS has reached a saturation voltage.

(Read of a high-illuminance signal level) After a specified elapsed time from time tLS, the first switching control signal SWA(0) changes from a low level to a high level, and the first switching transistor MSWA couples the floating diffusion capacitor CFD and the storage line capacitor CM in parallel. The charge arising from the reset noise and stored in the floating diffusion capacitor CFD, the charge transferred from the photoelectric conversion element PD1, the charge arising from the reset noise and stored in the storage line capacitor CM, and the charge overflowing from the floating diffusion capacitor CFD are stored in the floating diffusion capacitor CFD and the storage line capacitor CM which are coupled in parallel. The amplification transistor MAMI amplifies the voltage of the storage line capacitor CM and the floating diffusion capacitor CFD coupled in parallel (hereinafter also described as a "high-illuminance mixed signal"), and outputs it to the column circuit 31 via the select transistor MSEL and the vertical signal line VSL.

At time tHS when the first switching control signal SWA(0) is set at a high level, the programmable gain amplifier PGA included in the column circuit 31 outputs the high-illuminance signal level, generated by amplifying the high-illuminance mixed signal outputted by the amplification transistor MAMI, as the PGA output signal POUT.

(End of a read period TR (0)) After the completion of the read of the high-illuminance signal level, the logical level of the select transistor control signal SEL(0) is switched from a high level to a low level, and the selection of the pixel circuit PC1 arranged at the 0th row is terminated. Subsequently, the logical level of the reset transistor control signal RST1(0) is switched from a low level to a high level, and a charge stored in the floating diffusion capacitor CFD and the storage line capacitor CM is reset. Subsequently, the logical level of the first switching control signal SWA(0) is switched from a high level to a low level to set the first switching transistor MSWA in a non-conductive state, and each pixel circuit PC1 arranged at the 0th row is separated from each storage capacitance line CSL.

Figure 5:
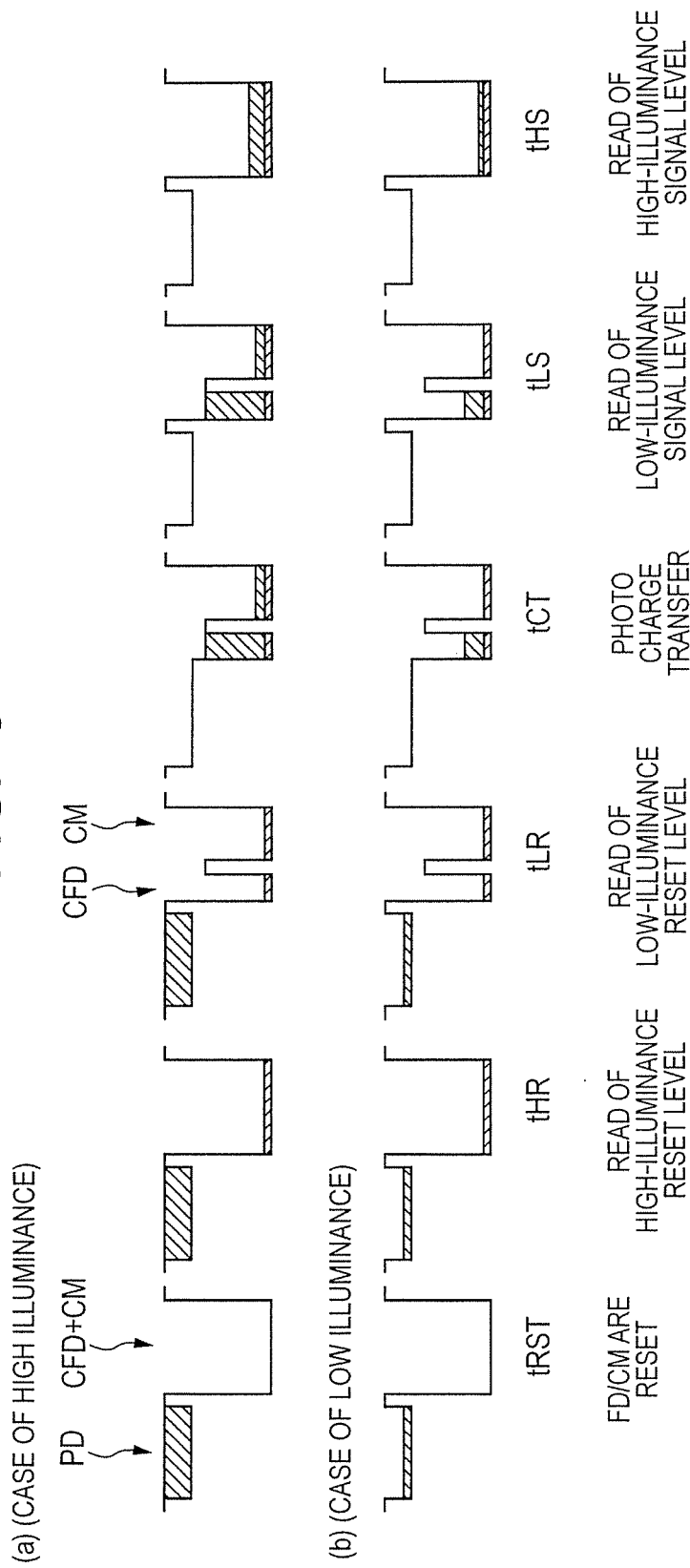
FIG. 5 is a potential chart at each time illustrated in FIG. 4.

FIG. 5 is a potential chart at each time illustrated in FIG. 4. The upper part (a) and the lower part (b) of FIG. 5 are potential charts when the photoelectric conversion element PD1 of the pixel circuit PC1 is subjected to the light of a high illuminance, and the light of a low illuminance, respectively. Here, "the light of a low illuminance" signifies the light of the illuminance of the degree to which the amount of the photo charge generated by the photoelectric conversion element PD1 is enough to be stored in the floating diffusion capacitor CFD. "The light of a high illuminance" signifies the light of the illuminance of the degree to which the amount of the photo charge generated by the photoelectric conversion element PD1 overflows from the floating diffusion capacitor CFD.

(In the case of a high illuminance) As illustrated in the upper part (a) of FIG. 5, after the end of the photoelectron storage period, at time tRST, the reset transistor MRST1 included in the pixel circuit PC1 arranged at the selected row resets the floating diffusion capacitor CFD and the storage line capacitor CM which are coupled in parallel by the first switching transistor MSWA. Here, the storage line capacitor CM to be reset includes the storage line capacitor CM in the non-selected row, in addition to the storage line capacitor CM in the selected row.

At time tHR, the read of the high-illuminance reset level is performed. The first switching transistor MSWA couples in parallel the floating diffusion capacitor CFD and the storage line capacitor CM, and the read of the "high-illuminance reset level" is performed.

At time tLR, the read of the low-illuminance reset level is performed. After canceling the parallel coupling of the floating diffusion capacitor CFD and the storage line capacitor CM by the first switching transistor MSWA, the read of the "low-illuminance reset level" arising from a charge stored in the floating diffusion capacitor CFD is performed.

At time tCT, a photo charge transfer is performed. The transfer transistor MTX1 is set in a conductive state, and the photo charge stored in the photoelectric conversion element PD1 is transferred to the floating diffusion capacitor CFD. A charge overflowing from the floating diffusion capacitor CFD is stored in the storage line capacitor CM.

At time tLS, the read of the low-illuminance signal level is performed. The amplification transistor MAMI amplifies the voltage of the floating diffusion capacitor CFD, and outputs it to the column circuit 31 via the select transistor MSEL and the vertical signal line VSL. The programmable gain amplifier PGA included in the column circuit outputs the "low-illuminance signal level." The upper part (a) of FIG. 5 illustrates a state where the low-illuminance signal level is saturated, since the photoelectric conversion element PD1 is subjected to the light of a high illuminance.

At time tHS, the read of the high-illuminance signal level is performed. The first switching transistor MSWA couples in parallel the floating diffusion capacitor CFD and the storage line capacitor CM. The amplification transistor MAMI amplifies the voltage of the floating diffusion capacitor CFD and the storage line capacitor CM coupled in parallel, and outputs it to the column circuit 31 via the select transistor MSEL and the vertical signal line VSL. The programmable gain amplifier PGA included in the column circuit 31 outputs the "high-illuminance signal level."

(In the case of a low illuminance) The lower part (b) of FIG. 5 is a potential chart at each time when the photoelectric conversion element PD1 is subjected to the light of a low illuminance. The difference between the upper part (a) and the lower part (b) of FIG. 5 lies in whether the photo charge overflows from the floating diffusion capacitor CFD (the upper part (a)) or does not overflow (the lower part (b)), in transferring the photo charge at time tCT. The difference originates from the difference in the photo charge amount stored in the photoelectric conversion element PD1 after the end of the photo charge storage period, as illustrated in FIG. 5. The signal read operations at time tRST, time tHR, time tLR, time tCT, time tLS, and time tHS are the same both in "the case of a high illuminance", and "the case of a low illuminance"; accordingly, the duplicated explanation thereof is omitted.

Figure 6:
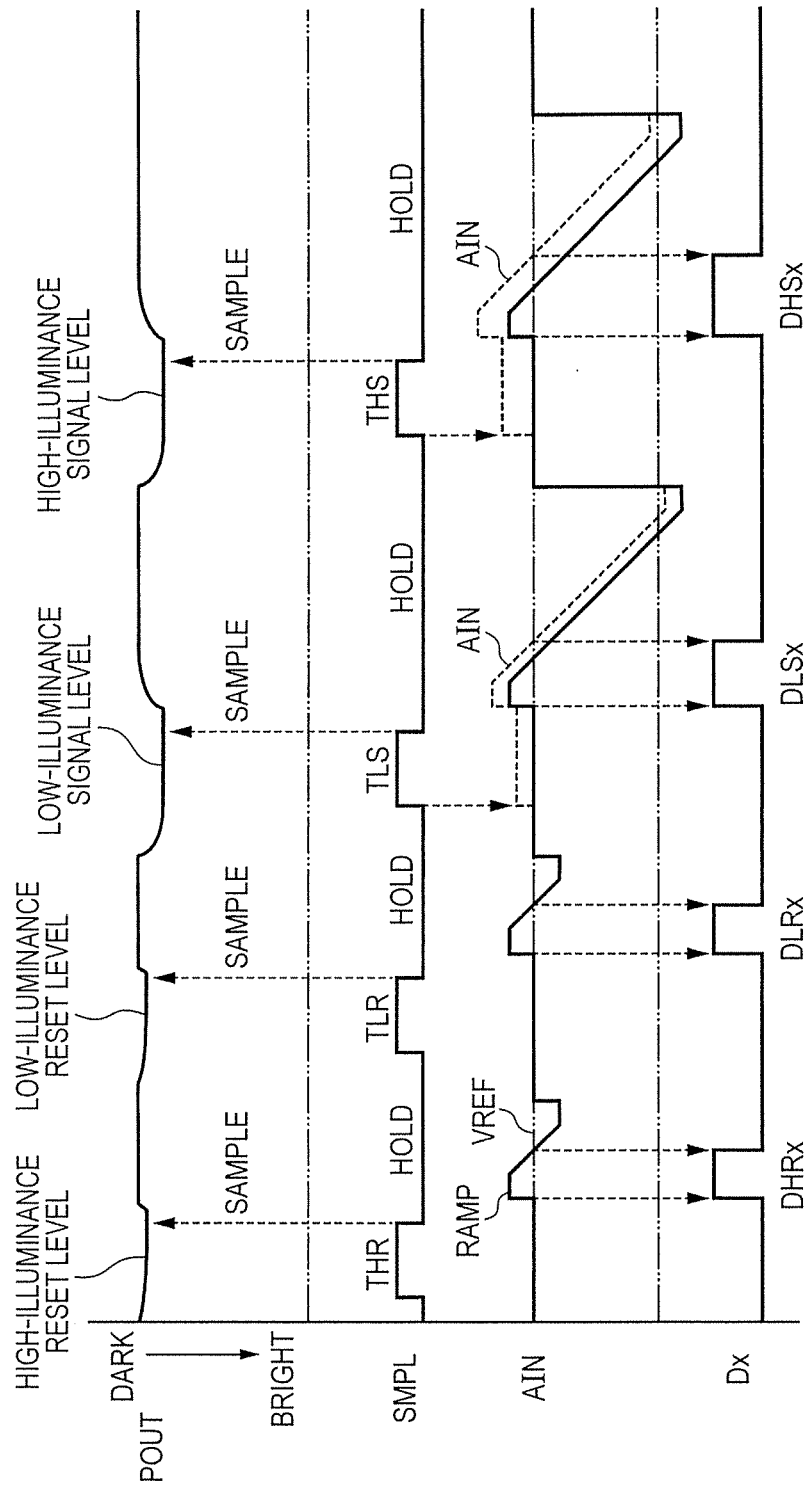
FIG. 6 is a timing chart illustrating the read operation of the pixel circuit by a single exposure in the column circuit illustrated in FIG. 1.

FIG. 6 is a timing chart illustrating the read operation of the pixel circuit PC1 by a single exposure in the column circuit 31 illustrated in FIG. 1.

In FIG. 6, the horizontal axis expresses time and the vertical axis expresses each signal wave form schematically. The vertical axis and the horizontal axis are in an arbitrary scale.

Operation of the column circuit 31 illustrated in FIG. 6 is explained with reference to FIGS. 3 and 5. As described above, the column circuit 31 (refer to FIG. 3) is configured with the programmable gain amplifier PGA and the A/D converter circuit ADC. The programmable gain amplifier PGA amplifies the voltage which is outputted by the amplification transistor MAMI of the pixel circuit PC1 and inputted via the vertical signal line VSL, and generates the PGA output signal POUT.

(Digitization of a reset level) The A/D converter circuit ADC samples and holds the high-illuminance reset level outputted by the programmable gain amplifier PGA in the capacitor C3 coupled to the positive input terminal AIN, based on the sampling signal SMPL with a pulse width THR. At the hold time, the high-illuminance reset level is shifted to the high potential side by a ramp signal RAMP with a prescribed slope and compared with the reference voltage VREF. In FIG. 6, a solid line indicates the ramp signal RAMP, a dashed-dotted line indicates the reference voltage VREF, and a dashed line indicates the PGA output signal POUT. It is assumed that the high-illuminance reset level and the low-illuminance reset level slightly exceed the value of the reference voltage VREF. Therefore, the dashed lines to indicate both reset levels are omitted in order to avoid the waveform chart becoming complicated.

The A/D converter circuit ADC outputs a high-illuminance digital reset signal DHRx which has a time width from the time when the ramp signal RAMP starts a rise to the time when the high-illuminance reset level shifted by the ramp signal RAMP becomes less than the reference voltage VREF. The last letter "x" in the signal name "DHRx" expresses that it is a high-illuminance digital reset signal of the pixel circuit PC1(x, n) outputted to the vertical signal line VSL(x) arranged at the xth column (refer to FIG. 1).

The A/D converter circuit ADC generates a low-illuminance digital reset signal DLRx following the generation of the high-illuminance digital reset signal DHRx. The A/D converter circuit ADC samples and holds, in the capacitor C3, the low-illuminance reset level outputted by the programmable gain amplifier PGA, based on the sampling signal SMPL with a one shot pulse of a pulse width TLR. At the hold time, the high-illuminance reset level is shifted to the high potential side by a ramp signal RAMP and compared with the reference voltage VREF. The A/D converter circuit ADC outputs a low-illuminance digital reset signal DLRx which has a time width from the time when the ramp signal RAMP starts a rise to the time when the low-illuminance reset level shifted by the ramp signal RAMP becomes less than the reference voltage VREF.

(Digitization of a signal level) The A/D converter circuit ADC generates a low-illuminance digital signal DLSx following the generation of the low-illuminance digital reset signal DLRx. The A/D converter circuit ADC samples and holds, in the capacitor C3, the low-illuminance signal level outputted by the programmable gain amplifier PGA, based on the sampling signal SMPL with a one shot pulse of a pulse width TLS. At the hold time, the low-illuminance signal level is shifted to the high potential side by a ramp signal RAMP and compared with the reference voltage VREF. The A/D converter circuit ADC outputs a low-illuminance digital signal DLSx which has a time width from the time when the ramp signal RAMP starts a rise to the time when the low-illuminance reset level shifted by the ramp signal RAMP becomes less than the reference voltage VREF.

The A/D converter circuit ADC generates a high-illuminance digital signal DHSx following the generation of the low-illuminance digital signal DLSx. The A/D converter circuit ADC samples and holds, in the capacitor C3, the high-illuminance signal level outputted by the programmable gain amplifier PGA, based on the sampling signal SMPL with a one shot pulse of a pulse width THS. At the hold time, the high-illuminance signal level is shifted to the high potential side by a ramp signal RAMP and compared with the reference voltage VREF. The A/D converter circuit ADC outputs a high-illuminance digital signal DHSx which has a time width from the time when the ramp signal RAMP starts a rise to the time when the high-illuminance reset level shifted by the ramp signal RAMP becomes less than the reference voltage VREF.

(Extraction of a signal component) By the above processing, the A/D converter circuit ADC outputs the low-illuminance digital reset signal DLRx, the low-illuminance digital signal DLSx, the high-illuminance digital reset signal DHRx, and the high-illuminance digital signal DHSx. The signal component for a low illuminance from which the reset noise and the low frequency noise have been removed is extracted by calculating the difference of the low-illuminance digital signal DLSx and the low-illuminance digital reset signal DLRx. Similarly, the signal component for a high illuminance is extracted by calculating the difference of the high-illuminance digital signal DHSx and the high-illuminance digital reset signal DHRx.

Figure 7:
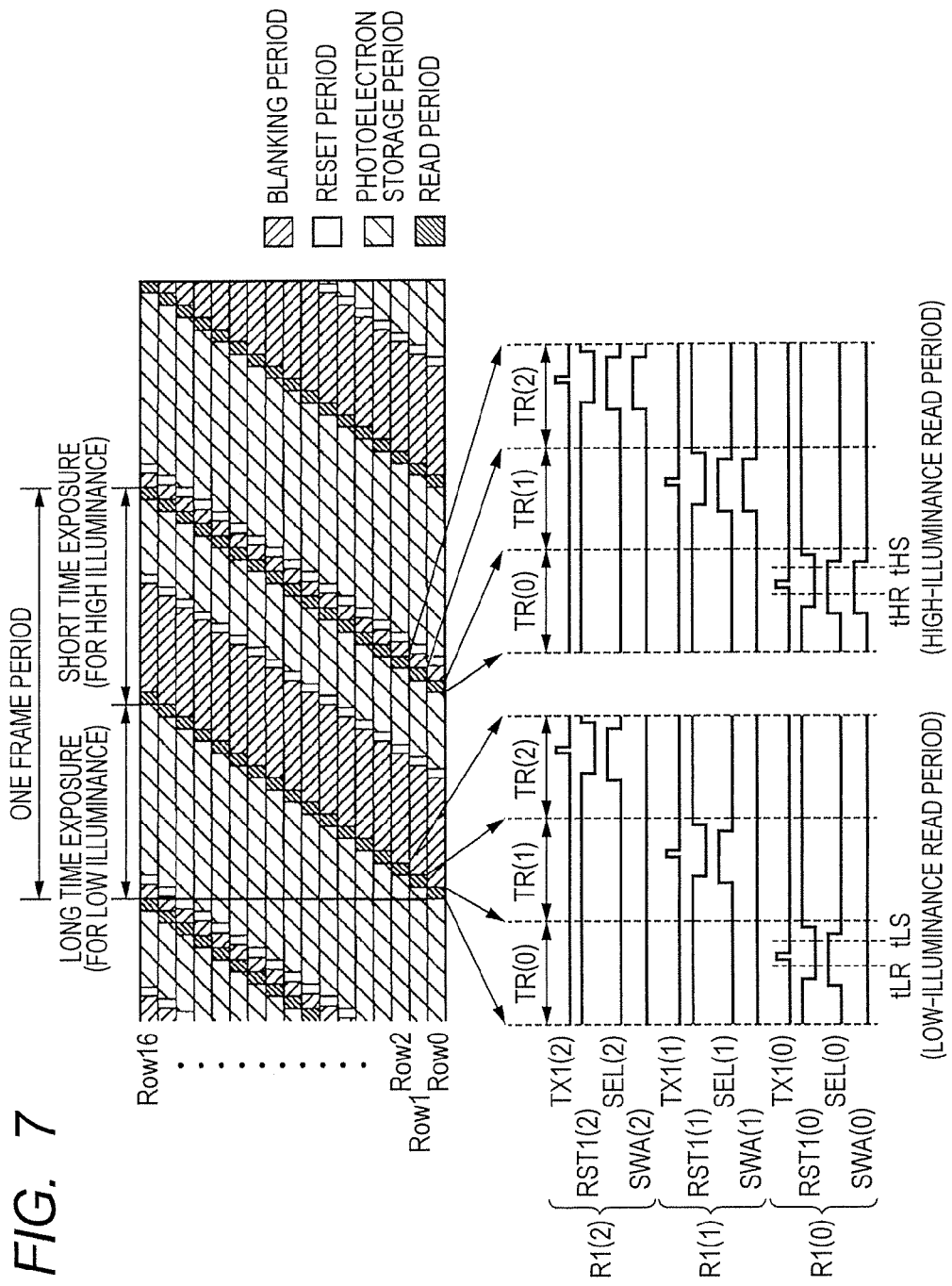
FIG. 7 is a timing chart illustrating the read operation by double exposures in the column circuit illustrated in FIG. 1.

FIG. 7 is a timing chart illustrating the read operation by double exposures in the column circuit 31 illustrated in FIG. 1.

Differently from the rolling shutter system with a single exposure illustrated in FIG. 4, FIG. 7 illustrates the timing chart of the rolling shutter system with double exposures as an example of the rolling shutter system with multiple exposures. In the rolling shutter system with double exposures, a long time exposure (for a low illuminance) and a short time exposure (for a high illuminance) are performed in one frame period. As shown in the timing chart at the upper part of FIG. 7, the photoelectron storage period in the long time exposure is set up for a longer time than the photoelectron storage period in the short time exposure. It is also preferable to change the order of the long time exposure and the short time exposure in the exposure sequence in one frame period. It is also preferable to control, independently and variably, the setup of the photoelectron storage time in the long time exposure and the short time exposure.

With reference to the waveform chart at the lower part of FIG. 7, the following explains the read operation in each exposure period, in the case of performing double exposures in the order illustrated in the timing chart at the upper part of FIG. 7.

(Low-illuminance read period) At a low-illuminance read period, in response to the first switching control signal SWA set at a low level, the first switching transistor MSWA included in each of the pixel circuits PC1 arranged from the 0th row (Row 0) to the 16th row (Row 16) is all set in a non-selected state. Consequently, in all the pixel circuits PC1, the floating diffusion capacitor CFD is separated from the storage line capacitor CM.

The floating diffusion capacitor CFD which has been reset by the reset transistor MRST1 is released from the reset by time tLR. The amplification transistor MAMI amplifies the reset noise of the floating diffusion capacitor CFD. The amplified reset noise is inputted into the column circuit 31 via the select transistor MSEL and the vertical signal line VSL.

At time tLR, the programmable gain amplifier PGA included in the column circuit 31 outputs the low-illuminance reset level, generated by amplifying the reset noise outputted by the amplification transistor MAMI, as the PGA output signal POUT. When the read of the low-illuminance reset noise is completed, in response to the one shot pulse of the transfer transistor control signal TX1, the photo charge stored in the photoelectric conversion element PD1 is transferred to the floating diffusion capacitor CFD. The amplification transistor MAMI amplifies the voltage of the floating diffusion capacitor CFD in which the photo charge has been stored, and outputs it to the column circuit 31.

At time tLS, the programmable gain amplifier PGA included in the column circuit 31 outputs the low-illuminance signal level, generated by amplifying the signal outputted by the amplification transistor MAMI, as the PGA output signal POUT. When the read of the low-illuminance reset level and low-illuminance signal level of the pixel circuit PC1 arranged at the 0th row is completed, the read of the low-illuminance reset level and low-illuminance signal level is performed sequentially up to the pixel circuit PC1 arranged at the last 16th row.

The A/D converter circuit ADC included in the column circuit 31 converts the low-illuminance reset level and the low-illuminance signal level into the low-illuminance digital reset signal DLR and the low-illuminance digital signal DLS, respectively, and outputs them.

(High-illuminance read period) In the low-illuminance read period, the reset by the reset transistor MRST1 and the voltage amplified by the amplification transistor MAMI have been directed to the floating diffusion capacitor CFD. On the other hand, the reset and the voltage amplification in the high-illuminance read period is directed to the floating diffusion capacitor CFD and the storage line capacitor CM which are coupled in parallel by the first switching transistor MSWA.

The floating diffusion capacitor CFD and the storage line capacitor CM coupled in parallel by the first switching transistor MSWA is reset and released from the reset by time tHR. The amplification transistor MAMI amplifies the reset noise of the floating diffusion capacitor CFD and the storage line capacitor CM coupled in parallel, and outputs the amplified reset noise to the column circuit 31 via the select transistor MSEL and the vertical signal line VSL.

At time tHR, the programmable gain amplifier PGA included in the column circuit 31 outputs the reset level, generated by amplifying the reset noise outputted by the amplification transistor MAMI, as the PGA output signal POUT. When the read of the high-illuminance reset level is completed, in response to the one shot pulse of the transfer transistor control signal TX1, the photo charge stored in the photoelectric conversion element PD1 is transferred to the floating diffusion capacitor CFD and the storage line capacitor CM coupled in parallel. The amplification transistor MAMI amplifies the voltage of the floating diffusion capacitor CFD in which the photo charge has been stored, and outputs it to the column circuit 31.

At time tHS, the programmable gain amplifier PGA included in the column circuit 31 outputs the high-illuminance signal level, generated by amplifying the signal outputted by the amplification transistor MAMI, as the PGA output signal POUT. When the read of the high-illuminance reset level and the high-illuminance signal level of the pixel circuit PC1 arranged at the 0th row is completed, the read of the high-illuminance reset level and high-illuminance signal level is performed sequentially up to the pixel circuit PC1 arranged at the last 16th row.

The A/D converter circuit ADC included in the column circuit 31 converts the high-illuminance reset level and the high-illuminance signal level into the high-illuminance digital reset signal DHR and the high-illuminance digital signal DHS, respectively, and outputs them.

The low-illuminance digital reset signal DLR, the low-illuminance digital signal DLS, the high-illuminance digital reset signal DHR, and the high-illuminance digital signal DHS are rendered to generate an HDR imaging (High Dynamic Range Imaging) by the digital signal processing circuit in the latter stage of the column circuit 31, thereby it is possible to obtain an image of a great dynamic range.

The effect of the imaging device 100 according to Embodiment 1 is explained. The pixel circuit PC1 is configured with the photoelectric conversion element PD1, the floating diffusion capacitor CFD to which a photo charge generated by the photoelectric conversion element PD1 is transferred, and the first switching transistor MSWA which controls coupling between the floating diffusion capacitor and the storage capacitance line SCL. The storage capacitance line SCL functions as the storage line capacitor CM which stores a charge overflowing from the floating diffusion capacitor, when reading a photo charge generated by the photoelectric conversion element PD1.

A general pixel circuit adopts, in many cases, a MOS capacitor as a capacitor which stores a charge overflowing from the floating diffusion capacitor. A MOS capacitor is formed at the interior of the semiconductor substrate, or on the surface of the semiconductor substrate, as is the case with the photoelectric conversion element PD1. The MOS capacitor has a small value of capacitance per unit area and there are area restrictions of the pixel circuit; therefore, it is difficult to increase the capacitance value of the MOS capacitor. When a stacked structure and high-k material are adopted instead of the MOS capacitor, there arises complication of the manufacturing process or cost increase due to the addition of new material.

On the other hand, the imaging device 100 according to Embodiment 1 forms the storage capacitance line SCL not at the interior of nor on the surface of the semiconductor substrate in which the photoelectric conversion element PD1 is formed, but with the use of the wiring layer. Consequently, provided that the pixel circuit has the same area, it is possible to enlarge the area of the photoelectric conversion element, compared with the general pixel circuit. Furthermore, it is possible to suppress the cost increase since ordinary manufacturing process and material can be employed.

It is possible to secure the length of the storage capacitance line SCL to the extent of the length of the pixel circuit PC1 in the column direction. When reading from the pixel circuit PC1, the storage capacitance line SCL is coupled only to the pixel circuit PC1 arranged at the selected column. Therefore, it is possible to store all the charge which overflows from the floating diffusion capacitor. Consequently, it becomes possible to store the photo charge generated by the photoelectric conversion element PD1 subjected to the light of a high illuminance, in the storage line capacitor CM, without increasing the capacitance value of the floating diffusion capacitor. As a result, it is possible to realize the imaging device of a great dynamic range, maintaining the sensitivity on the low-illuminance side and suppressing the appearance of clipped whites on the high-illuminance side.

Embodiment 2

Figure 8:
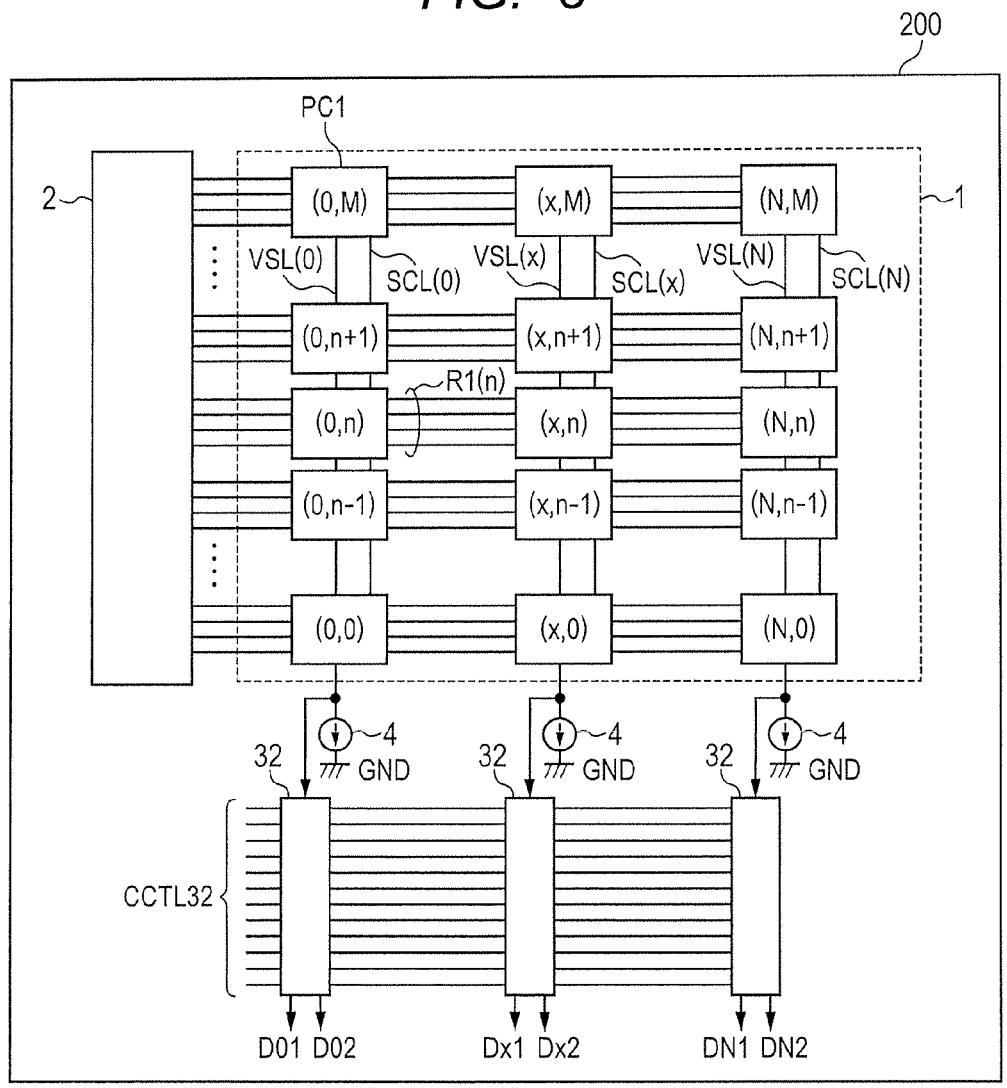
FIG. 8 is a block diagram illustrating a configuration of an imaging device according to Embodiment 2.

FIG. 8 is a block diagram illustrating a configuration of an imaging device 200 according to Embodiment 2.

In FIG. 8, an element to which the same symbol as in FIG. 1 is attached has the same configuration or the same function, and the duplicated explanation thereof will be omitted. The imaging device 200 illustrated in FIG. 8 corresponds, in configuration, to the imaging device 100 illustrated in FIG. 1 in which the column circuit 31 is replaced with a column circuit 32.

The imaging device 200 is configured with a pixel array 1, a vertical scanning circuit 2, a column circuit 32, and a constant current circuit 4. (N+1) column circuits 32 are arranged in the row direction. Each column circuit 32 converts an analog signal outputted by the corresponding vertical signal line VSL(x) into a digital signal Dx1 and a digital signal Dx2, and outputs them. The A/D (analog/ digital) conversion in each column circuit 32 is concurrently performed by a column circuit control signal group CCTL32.

Figure 9:
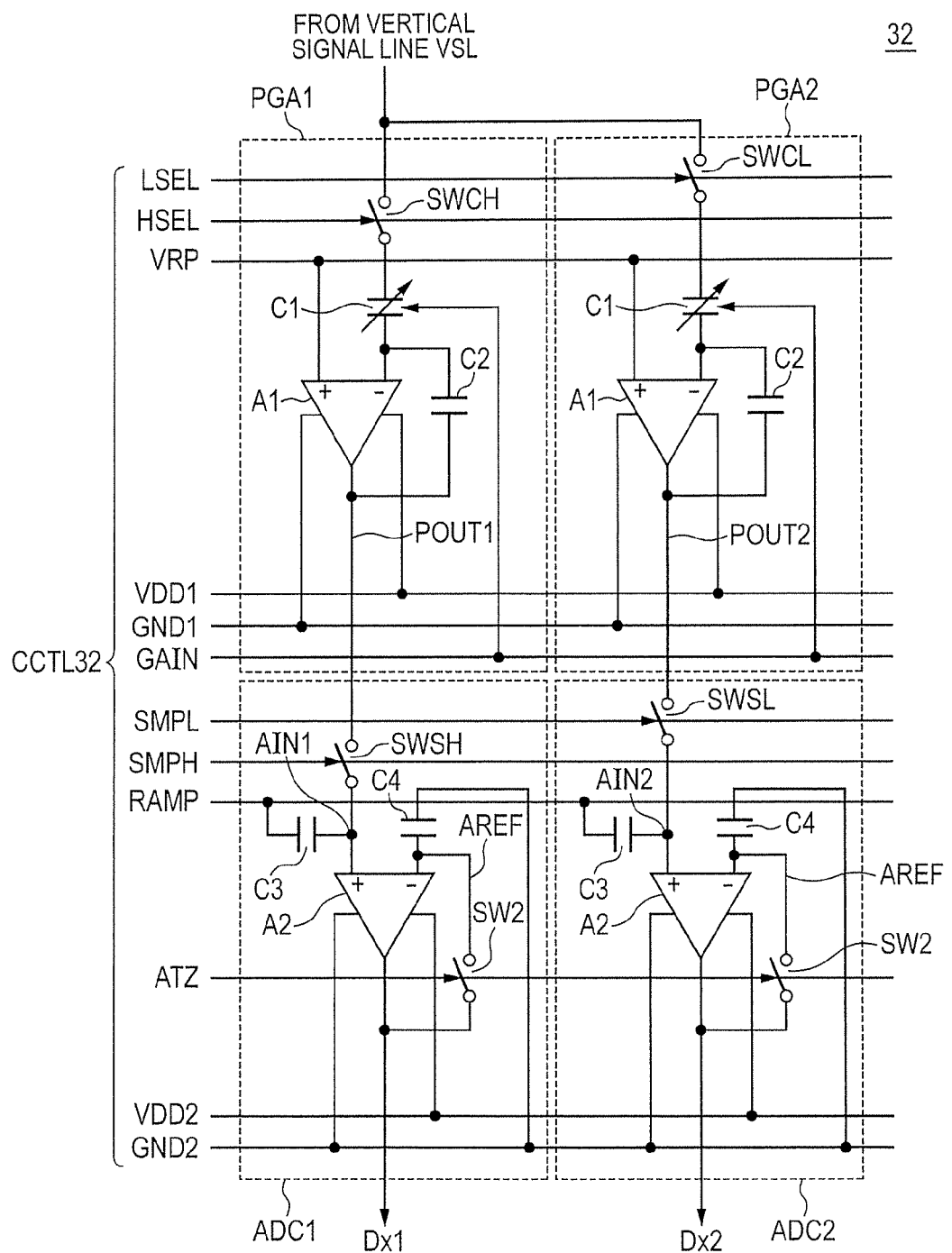
FIG. 9 is a circuit diagram of a column circuit illustrated in FIG. 8.

FIG. 9 is a circuit diagram of the column circuit 32 illustrated in FIG. 8. The column circuit 32 is configured with a programmable gain amplifier PGA1, a programmable gain amplifier PGA2, an A/D converter circuit ADC1, and an A/D converter circuit ADC2. The configuration and operation of the programmable gain amplifiers PGA1 and PGA2 are the same as those of the programmable gain amplifier PGA illustrated in FIG. 3. The configuration and operation of the A/D converter circuits ADC1 and ADC2 are the same as those of the A/D converter circuit ADC illustrated in FIG. 3.

A vertical signal line VSL is coupled to one end of a switch SWCH and one end of a switch SWCL. The other end of the switch SWCH is coupled to one end of an input capacitor C1 of the programmable gain amplifier PGA1, and the other end of the switch SWCL is coupled to one end of an input capacitor C1 of the programmable gain amplifier PGA2. The open/close states of the switch SWCH and the switch SWCL are complementarily controlled by a high-illuminance column selecting signal HSEL and a low-illuminance column selecting signal LSEL, respectively.

An output signal POUT1 of the programmable gain amplifier PGA1 is applied to a positive input terminal AIN1 of the A/D converter circuit ADC1 via a switch SWSH. An output signal POUT2 of the programmable gain amplifier PGA2 is applied to a positive input terminal AIN2 of the A/D converter circuit ADC2 via a switch SWSL. The open/close states of the switch SWSH and the switch SWSL are controlled by a sampling signal SMPH and a sampling signal SMPL, respectively.

The A/D converter circuit ADC1 converts the signal applied to the positive input terminal AIN1 into a digital signal Dx1 and outputs it. The A/D converter circuit ADC2 converts the signal applied to the positive input terminal AIN2 into a digital signal Dx2 and outputs it.

Figure 10:
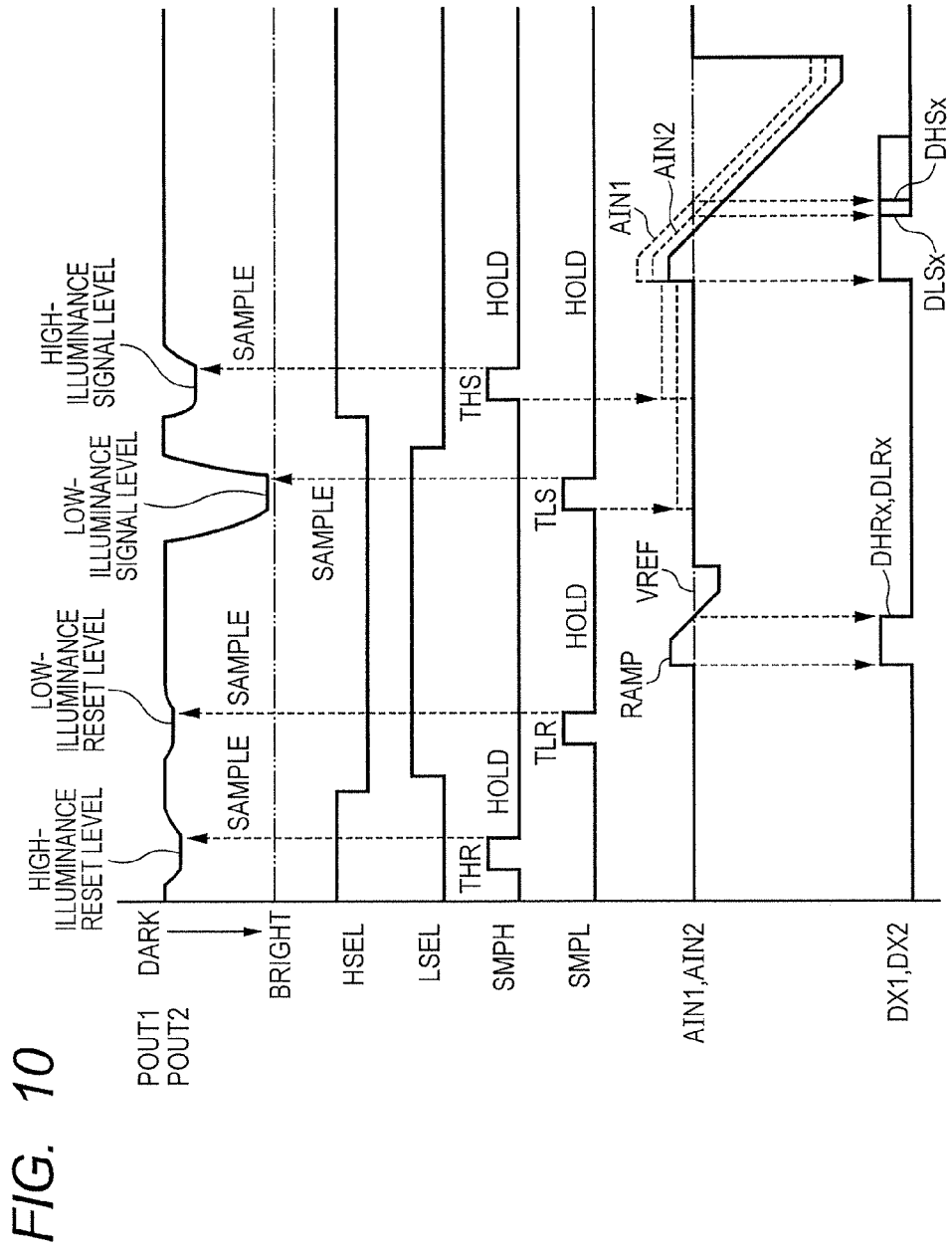
FIG. 10 is a timing chart illustrating the read operation of the pixel circuit by a single exposure in the column circuit illustrated in FIG. 9.

FIG. 10 is a timing chart illustrating the read operation of the pixel circuit PC1 by a single exposure in the column circuit 32 illustrated in FIG. 9.

In FIG. 10, the horizontal axis expresses time and the vertical axis expresses each signal wave form schematically. The vertical axis and the horizontal axis are in an arbitrary scale.

Operation of the column circuit 32 illustrated in FIG. 10 is explained with reference to FIGS. 5 and 9.

(Generation of a high illuminance digital reset signal DHRx and a low-illuminance digital reset signal DLRx) As illustrated in FIG. 5, after the reset of the floating diffusion capacitor CFD and the storage line capacitor CM, the amplification transistor MAMI of the pixel circuit PC1 amplifies a high-illuminance reset noise and a low-illuminance reset noise, and outputs them to the vertical signal line VSL(x), sequentially.

As illustrated in FIG. 10, when a high-illuminance column selecting signal HSEL is set at a high level and the low-illuminance column selecting signal LSEL is set at a low level, the programmable gain amplifier PGA1 outputs the high-illuminance reset level, generated by amplifying the high-illuminance reset noise outputted by the amplification transistor MAMI, as the PGA output signal POUT1. During the period when the programmable gain amplifier PGA1 outputs the high-illuminance reset level, the sampling signal SMPL is set at a low level, and at the same time, the sampling signal SMPH is made to generate a one shot pulse with a pulse width THR. Over the period of the pulse width THR, a high-illuminance reset level is applied to the positive input terminal AIN1 of the A/D converter circuit ADC1 via the switch SWSH. Even after the end of the one shot pulse of a pulse width THR, the high-illuminance reset level at the positive input terminal AIN1 of the A/D converter circuit ADC1 is held by the capacitor C3.

Subsequently, when the logical level of the high-illuminance column selecting signal HSEL and the low-illuminance column selecting signal LSEL are inverted, the programmable gain amplifier PGA2 outputs the low-illuminance reset level, generated by amplifying the low-illuminance reset noise outputted by the amplification transistor MAMI, as the PGA output signal POUT2. During the period when the programmable gain amplifier PGA2 outputs the low-illuminance reset level, the sampling signal SMPH is set at a low level, and at the same time, the sampling signal SMPL is made to generate a one shot pulse with a pulse width TLR. Over the period of the pulse width TLR, a low-illuminance reset level is applied to the positive input terminal AIN2 of the A/D converter circuit ADC2 via the switch SWSL. Even after the end of the sampling period TLR, the low-illuminance reset level at the positive input terminal AIN2 of the A/D converter circuit ADC2 is held by the capacitor C3.

When the high-illuminance reset level and the low-illuminance reset level are held respectively at the positive input terminal AIN1 of the A/D converter circuit ADC1 and at the positive input terminal AIN2 of the A/D converter circuit ADC2, a ramp signal RAMP is applied to the other end of the respective capacitor C3. The A/D converter circuit ADC1 and the A/D converter circuit ADC2 output concurrently a high-illuminance digital reset signal DHRx and a low-illuminance digital reset signal DLRx. The high-illuminance digital reset signal DHRx and the low-illuminance digital reset signal DLRx have respectively a time width from the time when the ramp signal RAMP is applied concurrently to the time when the high-illuminance reset level and the low-illuminance reset level which have been shifted to the high potential side by the ramp signal RAMP become less than the reference voltage VREF.

As is the case with FIG. 6, it is assumed that the high-illuminance reset level and the low-illuminance reset level slightly exceed the value of the reference voltage VREF; therefore, dashed lines to indicate both reset levels are omitted in order to avoid the waveform chart becoming complicated.

(Generation of a high illuminance digital signal DHSx and a low-illuminance digital signal DLSx) As illustrated in FIG. 5, after an elapsed time tCT, the amplification transistor MAMI of the pixel circuit PC1 outputs a low-illuminance mixed signal and a high-illuminance mixed signal to the vertical signal line VSL(x), sequentially.

As illustrated in FIG. 10, by maintaining the high-illuminance column selecting signal HSEL at a low level and the low-illuminance column selecting signal LSEL at a high level, the programmable gain amplifier PGA2 amplifies the low-illuminance mixed signal inputted via the vertical signal line VSL(x), and outputs a low-illuminance signal level as the PGA output signal POUT2. During the period when the programmable gain amplifier PGA2 outputs the low-illuminance signal level, the sampling signal SMPH is set at a low level, and at the same time, the sampling signal SMPL is made to generate a one shot pulse with a pulse width TLS. Over the period of the sampling period TLS, a low-illuminance signal level is applied to the positive input terminal AIN2 of the A/D converter circuit ADC2 via the switch SWSL. Even after the end of the sampling period TLS, the low-illuminance signal level at the positive input terminal AIN2 of the A/D converter circuit ADC2 is held by the capacitor C3.

Subsequently, when the logical level of the high-illuminance column selecting signal HSEL and the low-illuminance column selecting signal LSEL is inverted, the programmable gain amplifier PGA1 amplifies the high-illuminance mixed signal inputted via the vertical signal line VSL(x), and outputs a high-illuminance signal level as the PGA output signal POUT1. During the period when the programmable gain amplifier PGA1 outputs the high-illuminance signal level, the sampling signal SMPL is set at a low level, and at the same time, the sampling signal SMPH is made to generate a one shot pulse with a pulse width THS. Over the period of the pulse width THS, a high-illuminance signal level is applied to the positive input terminal AIN1 of the A/D converter circuit ADC1 via the switch SWSH. Even after the end of the one shot pulse of a pulse width THS, the high-illuminance signal level at the positive input terminal AIN1 of the A/D converter circuit ADC1 is held by the capacitor C3.

When the low-illuminance signal level and the high-illuminance signal level are held respectively at the positive input terminal AIN2 of the A/D converter circuit ADC2 and at the positive input terminal AIN1 and the A/D converter circuit ADC1, a ramp signal RAMP is applied to the other end of the respective capacitor C3. The A/D converter circuit ADC2 and the A/D converter circuit ADC1 output concurrently a low-illuminance digital signal DLSx and a high-illuminance digital signal DHSx. The low-illuminance digital signal DLSx and the high-illuminance digital signal DHSx have respectively a time width from the time when the ramp signal RAMP is applied concurrently to the time when the low-illuminance signal level and the high-illuminance signal level which have been shifted to the high potential side by the ramp signal RAMP become less than the reference voltage VREF.

The effect of Embodiment 2 is explained by contrast with FIG. 6. The column circuit 32 is configured with the high-illuminance column circuit (the programmable gain amplifier PGA1 and the A/D converter circuit ADC1) and the low-illuminance column circuit (the programmable gain amplifier PGA2 and the A/D converter circuit ADC2) arranged in parallel for every column of the pixel circuit PC1, and the signal which is outputted sequentially by the vertical signal line VSL is inputted into the high-illuminance column circuit and the low-illuminance column circuit sequentially by the multiplexer configured with the switch SWCH and the switch SWCL.

The programmable gain amplifier PGA1 included in the high-illuminance column circuit and the programmable gain amplifier PGA2 included in the low-illuminance column circuit amplify the signal outputted sequentially by the amplification transistor MAMI of the pixel circuit PC1 via the vertical signal line VSL, and generate the high-illuminance reset level and the low-illuminance reset level. When the A/D converter circuit ADC1 and the A/D converter circuit ADC2 hold the high-illuminance reset level and the low-illuminance reset level at the input terminal respectively, the A/D converter circuit ADC1 and the A/D converter circuit ADC2 perform the A/D conversion concurrently.

As for the processing time of the column circuit 32, the A/D converter circuit ADC1 and the A/D converter circuit ADC2 are dominant. In particular, when the amplitude of the signal inputted into the A/D converter circuit ADC1 and the A/D converter circuit ADC2 becomes large, the increase in the processing time of the column circuit 32 is more remarkable. Even when the input signal of such large amplitude is processed, the processing time of the column circuit 32 is settled just over or below 40% of the processing time of the column circuit 31 illustrated in FIG. 6, by operating the A/D converter circuit ADC1 and the A/D converter circuit ADC2 concurrently. As a result, it is possible to enhance the speed of the image processing capability of the imaging device 200, by the speed enhancement of the column circuit 32.

Embodiment 3

Figure 11:
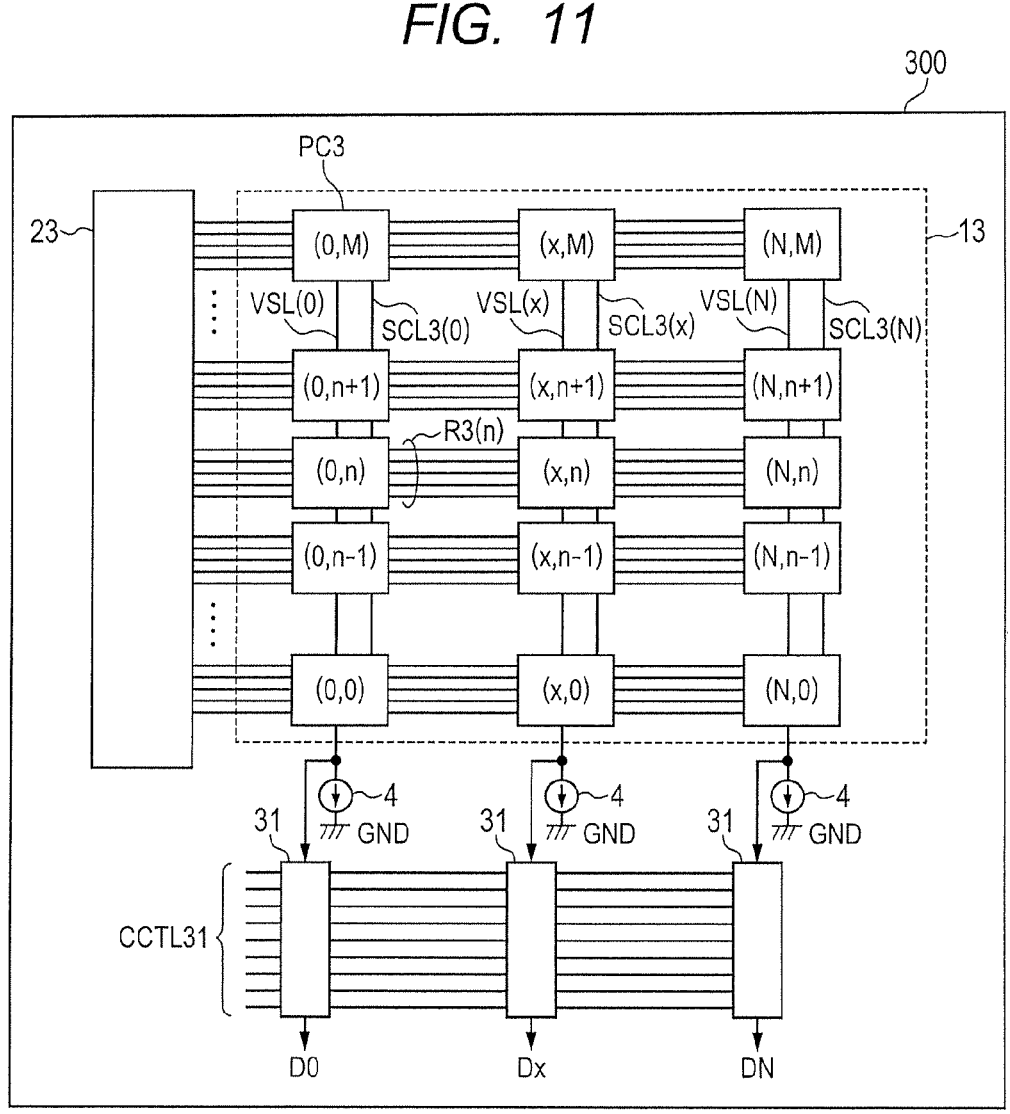
FIG. 11 is a block diagram illustrating a configuration of an imaging device according to Embodiment 3.

FIG. 11 is a block diagram illustrating a configuration of the imaging device 300 according to Embodiment 3.

In FIG. 11, an element to which the same symbol as in FIG. 1 is attached has the same configuration or the same function, and the duplicated explanation thereof will be omitted. The imaging device illustrated in FIG. 11 corresponds, in configuration, to the imaging device 100 illustrated in FIG. 1 in which the pixel array 1 is replaced with a pixel array 13 and the vertical scanning circuit 2 is replaced with a vertical scanning circuit 23.

The imaging device 300 is configured with a pixel array 13, a vertical scanning circuit 23, a column circuit 31, and a constant current circuit 4.

The pixel array 13 includes a pixel circuit PC3, a vertical signal line VSL, and a storage capacitance line SCL3. The pixel circuit PC3 is arranged in the shape of an array of (N+1) pieces in the row direction and (M+1) pieces in the column direction. The vertical signal line VSL extends in the column direction, and (N+1) vertical signal lines are arranged in the row direction, with the same number as the number of the pixel circuits PC3. The storage capacitance line SCL3 extends in the column direction and (N+1) storage capacitance lines are arranged in the row direction, with the same number as the number of the pixel circuits PC3. A bias current is applied to each vertical signal line VSL by the constant current circuit 4.

The vertical scanning circuit 23 outputs a row selection signal group R3(n) which selects one row of the pixel circuit PC3 from the plural rows of the pixel circuit PC3. As is the case with Embodiment 1, each column circuit 31 converts an analog signal outputted by the corresponding vertical signal line VSL(x) into a digital signal Dx, and outputs the digital signal Dx. The A/D (analog/digital) conversion in each column circuit 31 is concurrently controlled by a column circuit control signal group CCTL31.

Figure 12:
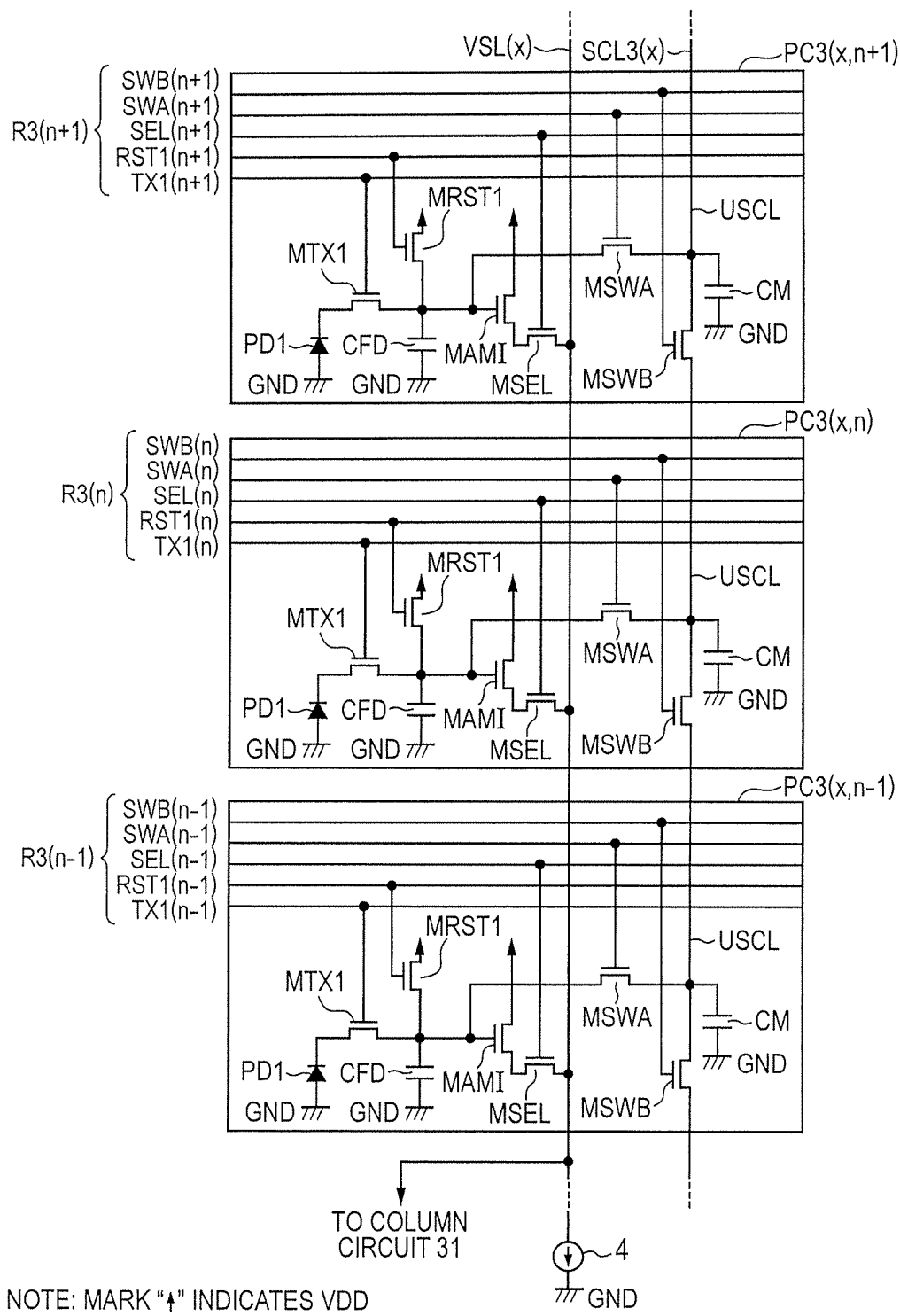
FIG. 12 is a circuit diagram of a pixel circuit illustrated in FIG. 11.

FIG. 12 is a circuit diagram of a pixel circuit PC3 illustrated in FIG. 11. The pixel circuit PC3 corresponds, in configuration, to the pixel circuit PC1 illustrated in FIG. 2 in which a second switching transistor MSWB and a unit storage capacitance line USCL are added. Accordingly, the row selection signal group R3(n) for selecting the pixel circuit PC3(x, n) arranged at the nth row is configured by adding the second switching control signal SWB(n) for controlling the conductive state of the second switching transistor MSWB, to the row selection signal group R1(n) illustrated in FIG. 1. The unit storage capacitance line USCL corresponds to a portion of the storage capacitance line SCL (x) which is included in the pixel circuit PC3(x, n).

In the pixel circuit PC3(x, n), one of a source and a drain of the first switching transistor MSWA is coupled to the unit storage capacitance line USCL. A source of the second switching transistor MSWB is coupled to one end of the unit storage capacitance line USCL. A drain of the second switching transistor MSWB is coupled to the other end of the unit storage capacitance line USCL included in the pixel circuit PC3(x, n−1). The other end of the unit storage capacitance line USCL included in the pixel circuit PC3(x, n) is coupled to a drain of the second switching transistor MSWB included in the pixel circuit PC3(x, n+1).

Figure 13:
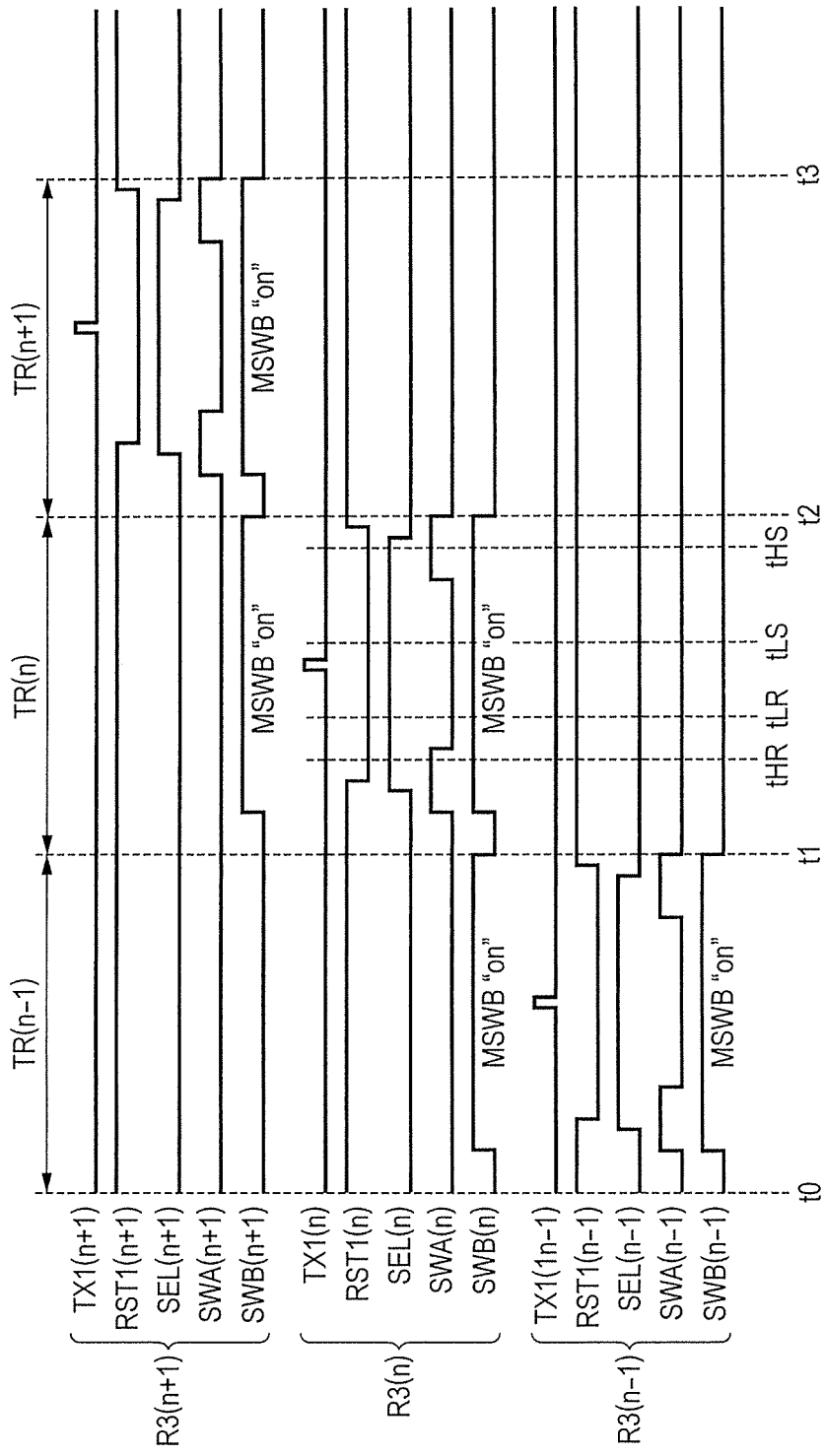
FIG. 13 is a timing chart explaining the read operation of the pixel circuit illustrated in FIG. 12.

FIG. 13 is a timing chart explaining the read operation of the pixel circuit PC3 illustrated in FIG. 12. The timing chart illustrated in FIG. 13 is explained referring to FIG. 12. As is the case with FIG. 4, FIG. 13 illustrates the timing chart in the case of reading the data of the pixel circuit PC3 in a rolling shutter system with a single exposure.

In FIG. 13, the read period TR(n−1), the read period TR(n), and the read period TR(n+1) indicate the read period of the pixel circuit PC3 arranged at the (n−1)th row, the nth row, and the (n+1)th row, respectively. The following explains the read timing of the pixel circuit PC3(x, n) arranged at the nth row.

Just before the read period TR(n−1) from time t0 to time t1 ends, the first switching control signal SWA(n−1), the second switching control signal SWB(n−1), the reset transistor control signal RST1(n−1), and the second switching control signal SWB(n) are set at a high level, and the storage line capacitor CM included in the pixel circuit PC3(x, n−1) and the pixel circuit PC3(x, n) is reset by the reset transistor MRST1 included in the pixel circuit PC3(x, n−1).

After a specified elapsed time from time t1 when the read period TR(n) begins, when the second switching control signal SWB(n) and the second switching control signal SWB(n+1) change from a low level to a high level, each second switching transistor MSWB included in the pixel circuit PC3(x, n) and the pixel circuit PC3(x, n+1) is set in a conductive state. As a result, in the pixel circuit PC3(x, n) selected in the read period TR(n), the floating diffusion capacitor CFD is coupled in parallel to the storage line capacitor CM for three pixel circuits PC3, via the first switching transistor MSWA and the second switching transistor MSWB.

Before time tHR, the floating diffusion capacitor CFD of the pixel circuit PC3(x, n) and each storage line capacitor CM of the pixel circuit PC3(x, n−1) to the pixel circuit PC3(x, n+1) are reset and released from the reset by the reset transistor MRST1 of the pixel circuit PC3(x, n).

At time tHR, the programmable gain amplifier PGA included in the column circuit 31 amplifies the signal inputted via the vertical signal line VSL(x), and outputs a high-illuminance reset level as the PGA output signal POUT. Subsequently, at time tLR, time tLS, and time tHS, the programmable gain amplifier PGA outputs a low-illuminance reset level, a low-illuminance signal level, and a high-illuminance signal level, sequentially. During this period, the pixel circuit PC3(x, n−1) to the pixel circuit PC3(x, n+1) are coupled by the first switching transistor MSWA, as described above.

When the read of the high-illuminance signal level which has started at time tHS is completed, the first switching transistor MSWA and the second switching transistor MSWB of the pixel circuit PC3(x, n) and the second switching transistor MSWB of the pixel circuit PC3(x, n+1) are maintained in a conductive state. In that state, the reset transistor MRST1 of the pixel circuit PC3(x, n) is set in a conductive state and the residual charge of the storage line capacitor CM of the pixel circuit PC3(x, n−1) to the pixel circuit PC3(x, n+1) is discharged.

As is the case with the read period TR(n), in the read period TR(n+1) from time t2 to time t3, the first switching transistor MSWA included in the pixel circuit PC3(x, n+1) arranged at the selected (n+1) th row and the first switching transistor MSWA included in the pixel circuit PC3(x, n+2) arranged at the non-selected (n+2)th row are set in a conductive state, accordingly, it becomes possible to couple in parallel the capacitor CM of three unit storage capacitance lines USCL to the floating diffusion capacitor CFD of the pixel circuit PC3(x, n+1) arranged at the selected (n+1)th row.

In addition to the pixel circuit PC3(x, n) arranged at the selected nth row and the pixel circuit PC3(x, n+1) arranged at the non-selected (n+1)th row, the second switching transistor MSWB included in the pixel circuit PC3(x, n+2) arranged at the non-selected (n+2)th row is set in a conductive state, accordingly, it becomes possible to couple in parallel the capacitor CM of five unit storage capacitance lines USCL to the floating diffusion capacitor CFD of the pixel circuit PC3 arranged at the selected row.

The effect of imaging device 300 according to Embodiment 3 is explained. In the imaging device 100 according to Embodiment 1, only the pixel circuit PC1 arranged at the selected row is coupled to the storage capacitance line SCL via the first switching transistor MSWA, and the pixel circuit PC1 arranged at other non-selected rows is electrically disconnected from the storage capacitance line SCL. As a result, as for the pixel circuit PC1 arranged at the selected row, the capacitor of the storage line capacitor CM multiplied by the number of rows, that is, the capacitor of the entire storage capacitance line SCL, is coupled in parallel to the floating diffusion CFD. On the other hand, in the imaging device 300, it is possible to select the number of the storage line capacitors CM coupled in parallel to the floating diffusion capacitor CFD of the pixel circuit PC3. Consequently, it is possible to optimize the number of the storage line capacitors CM which should be coupled to the floating diffusion capacitor, according to the number of the pixel circuits arranged in the column direction.

Embodiment 4

Figure 14:
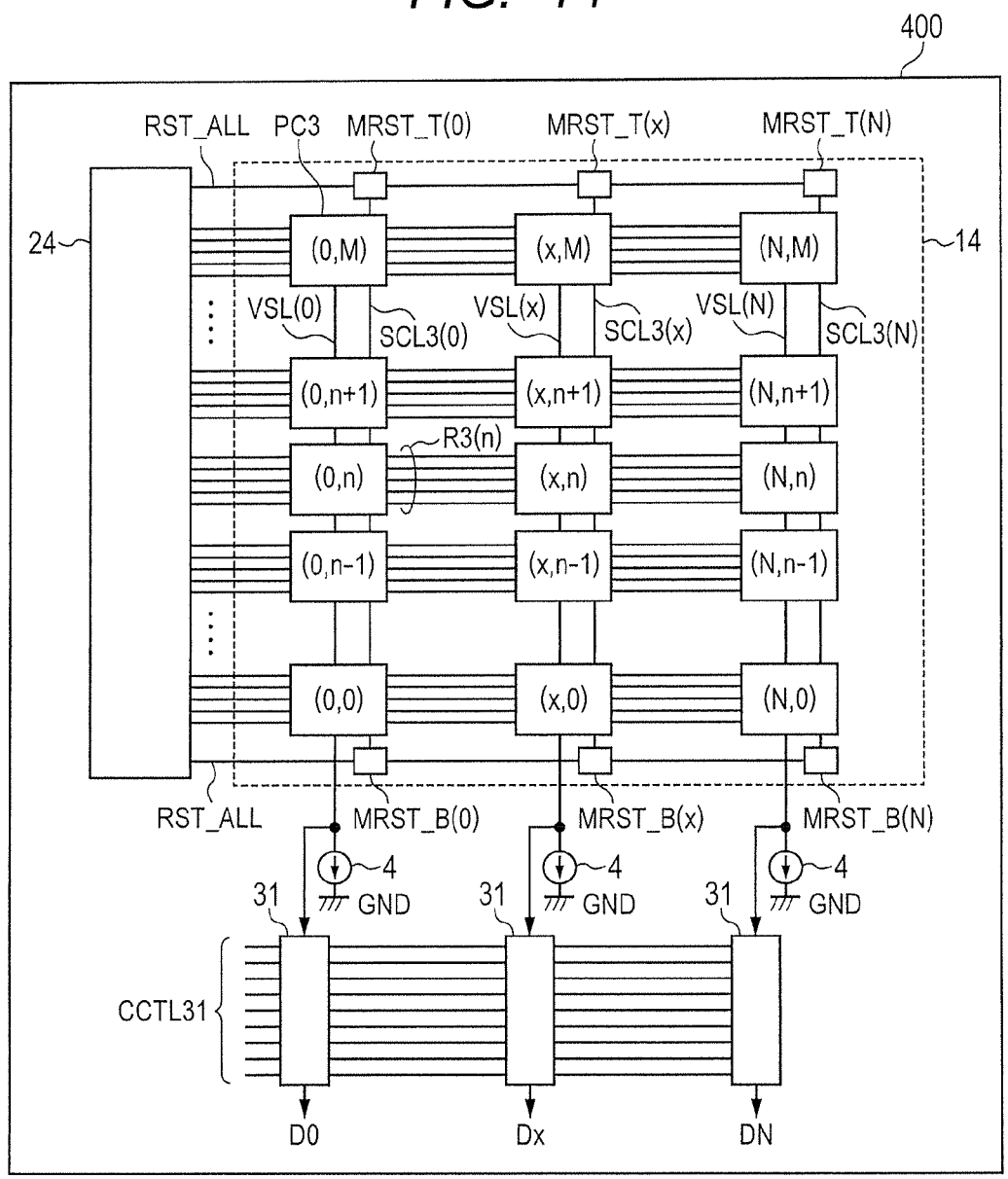
FIG. 14 is a block diagram illustrating a configuration of an imaging device according to Embodiment 4.

FIG. 14 is a block diagram illustrating a configuration of an imaging device 400 according to Embodiment 4.

In FIG. 14, an element to which the same symbol as in FIG. 11 is attached has the same configuration or the same function, and the duplicated explanation thereof will be omitted. The imaging device 400 illustrated in FIG. 14 corresponds, in configuration, to the imaging device 300 illustrated in FIG. 11 in which a top reset transistor MRST_T(x) and a bottom reset transistor MRST_B(x) are added and the vertical scanning circuit 23 is replaced with a vertical scanning circuit 24. In addition to the row selection signal group R3(n), the vertical scanning circuit 24 outputs a reset signal RST_ALL which controls the conductive state of the top reset transistor MRST_T(x) and the bottom reset transistor MRST_B(x).

The pixel array 14 is configured with a pixel circuit PC3, a vertical signal line VSL, a storage capacitance line SCL, a top reset transistor MRST_T(x), and a bottom reset transistor MRST_B(x).

Figure 15:
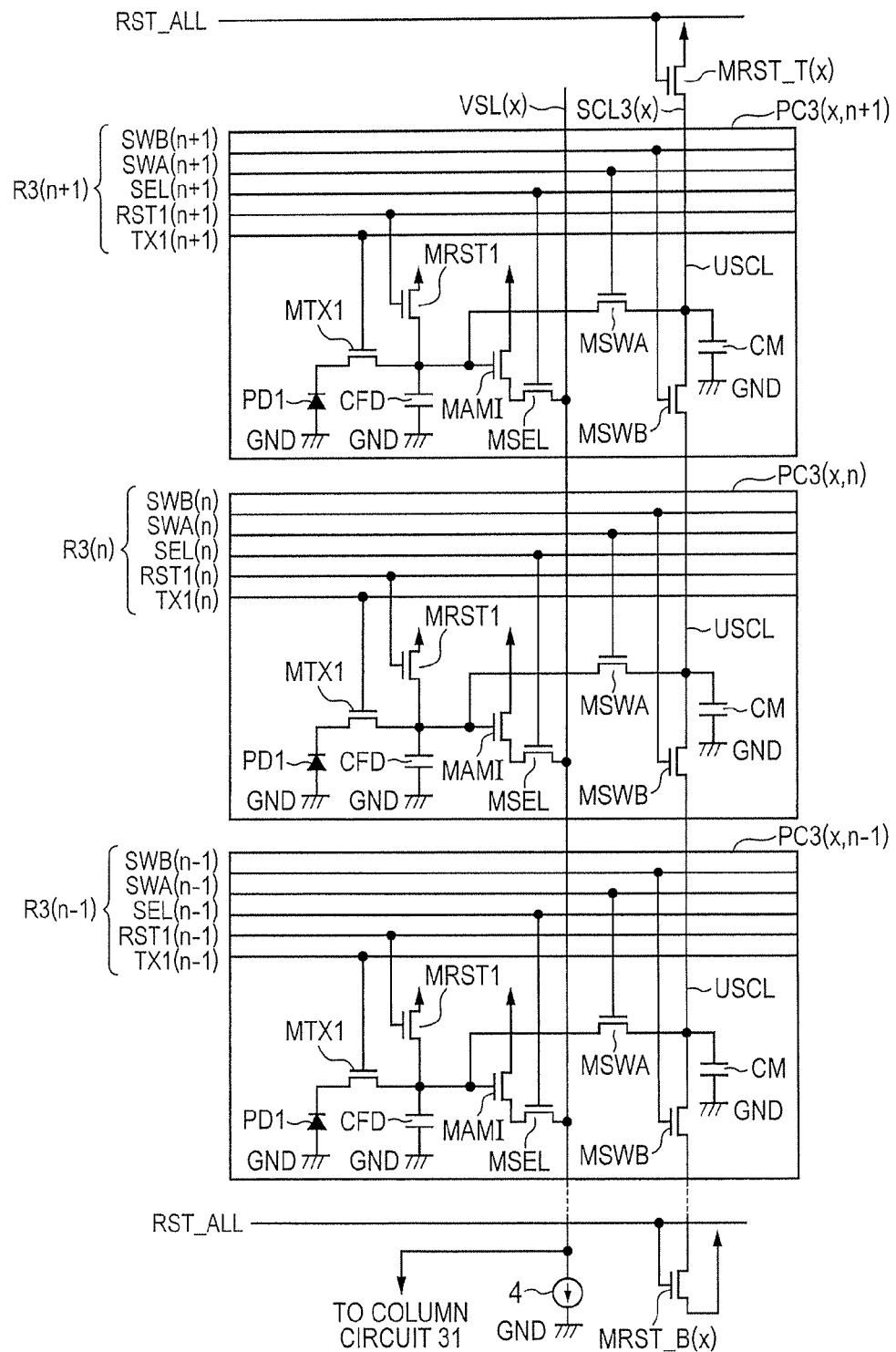
FIG. 15 is a circuit diagram illustrating the coupling relation of a pixel circuit, a top reset transistor, and a bottom reset transistor illustrated in FIG. 14.

FIG. 15 is a circuit diagram illustrating the coupling relation of the pixel circuit PC3, the top reset transistor MRST_T(x), and the bottom reset transistor MRST_B(x), illustrated in FIG. 14.

The source of the second switching transistor MSWB included in the pixel circuit PC3(x, M) arranged at the top side (the opposite side of the side where the column circuit 31 is arranged) of the pixel array 14 is coupled to a drain of the top reset transistor MRST_T(x). The power supply voltage VDD is applied to a source of the top reset transistor MRST_T(x). The drain of the second switching transistor MSWB included in the pixel circuit PC3(x, 0) arranged at the bottom side (the side where the column circuit 31 is arranged) of the pixel array 14 is coupled to a drain of the bottom reset transistor MRST_B(x). The power supply voltage VDD is applied to a source of the bottom reset transistor MRST_B(x). A reset signal RST_ALL outputted by the vertical scanning circuit 24 is applied to a gate of the top reset transistor MRST_T(x) and to a gate of the bottom reset transistor MRST_B(x).

Figure 16:
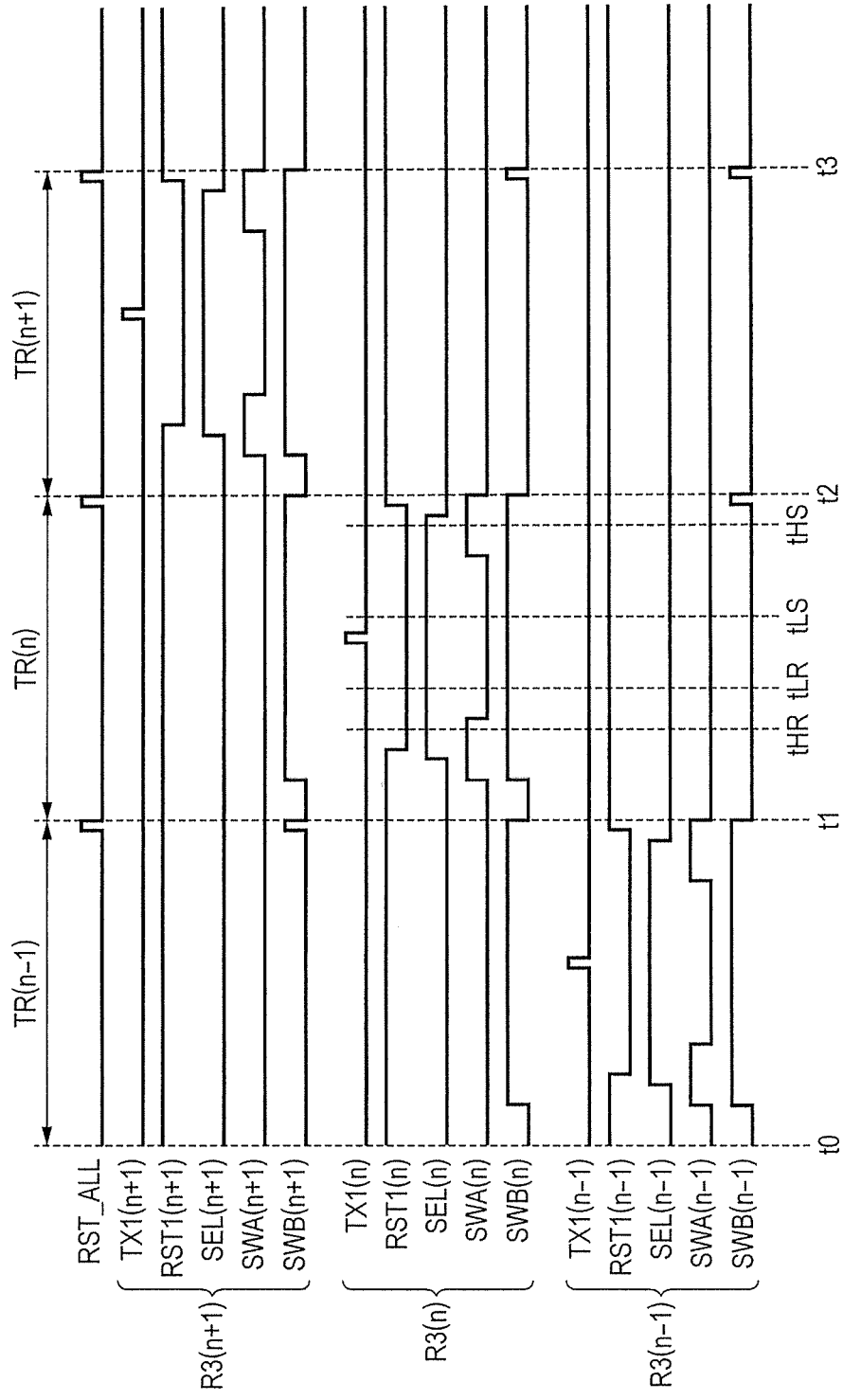
FIG. 16 is a timing chart explaining the read operation of the pixel circuit illustrated in FIG. 15.

FIG. 16 is a timing chart explaining the read operation of the pixel circuit PC3 illustrated in FIG. 15. The timing chart illustrated in FIG. 16 is different from the timing chart illustrated in FIG. 13 in the following points.

That is, in FIG. 13, when the read of the pixel circuit PC3 (x, n) arranged at the selected nth row is completed, the first switching transistor MSWA and the second switching transistor MSWB of the pixel circuit PC3(x, n) and the second switching transistor MSWB of the pixel circuit PC3(x, n+1) are maintained in a conductive state, up to time t2. During the period, the reset transistor MRST1 of the pixel circuit PC3(x, n) set in a conductive state discharges the residual charge of the storage line capacitor CM from the pixel circuit PC3(x, n−1) to the pixel circuit PC3(x, n+1).

On the other hand, as illustrated in FIG. 16, in the read period TR(n), in addition to the above-described control of the pixel circuit PC3, the vertical scanning circuit 24 discharges the residual charge of the storage line capacitor CM from the pixel circuit PC3(x, n−1) to the pixel circuit PC3(x, n+1), with the use of the top reset transistor MRST_T(x) and the bottom reset transistor MRST_B(x).

Immediately before time t2 when the read period TR(n) ends, a one shot pulse is generated in the reset signal RST_ALL, and at the same time, the one shot pulse is applied to the second switching control signal SWB included in the pixel circuit PC3 arranged at rows other than the pixel circuit PC3(x, n) of the nth row and the pixel circuit PC3(x, n+1) of the (n+1)th row. Accordingly, the residual charge of the storage line capacitor CM included in the each pixel circuit PC3 is discharged to the power supply, also by the top reset transistor MRST_T(x) and the bottom reset transistor MRST_B(x).

The effect of imaging device 400 according to Embodiment 4 is as follows. The residual charge of the storage line capacitor CM is discharged quickly, and a high-speed operation is realized.

Embodiment 5

Figure 17:
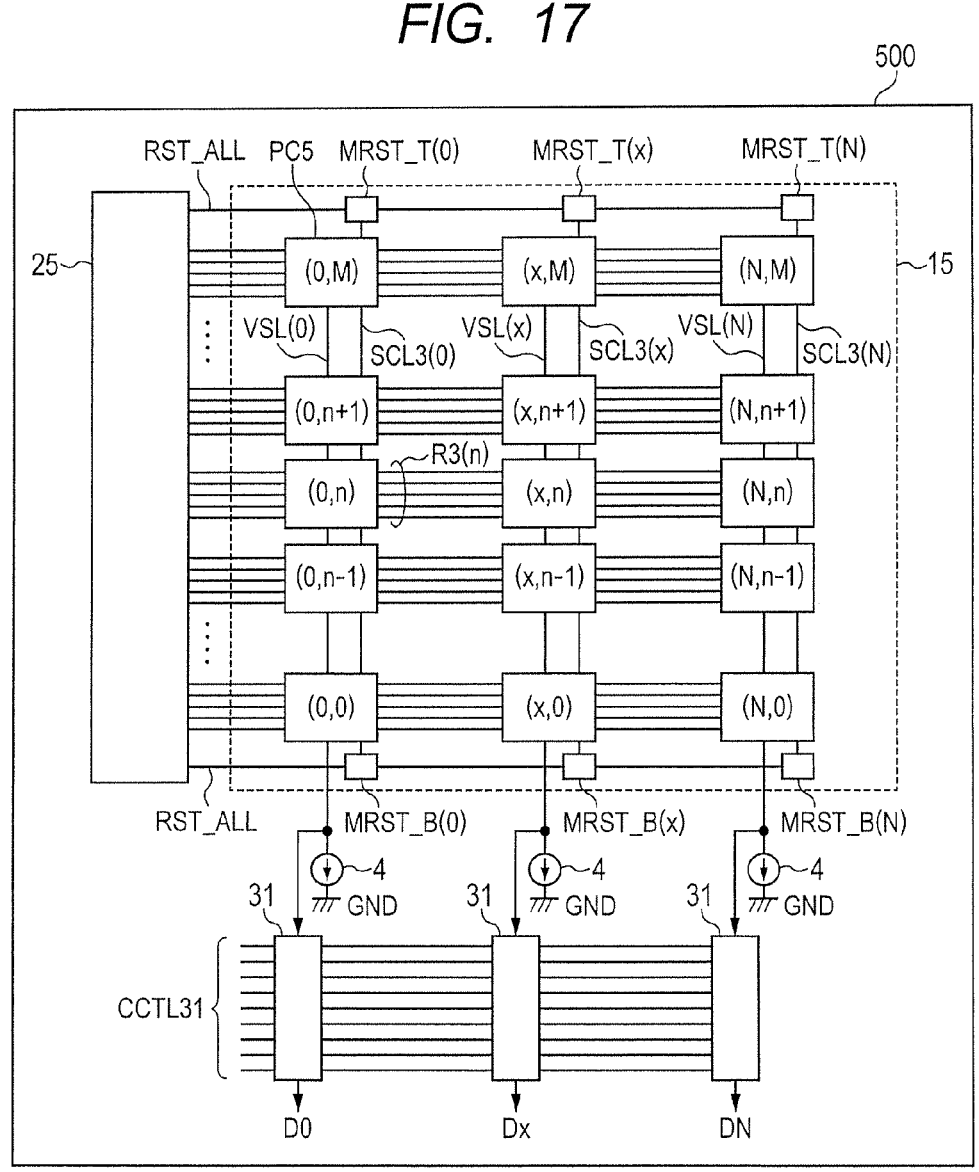
FIG. 17 is a block diagram illustrating a configuration of an imaging device according to Embodiment 5.

FIG. 17 is a block diagram illustrating a configuration of an imaging device 500 according to Embodiment 5.

In FIG. 17, an element to which the same symbol as in FIG. 14 is attached has the same configuration or the same function, and the duplicated explanation thereof will be omitted. The imaging device 500 illustrated in FIG. 17 corresponds, in configuration, to the imaging device 400 illustrated in FIG. 14 in which the pixel circuit PC3 is replaced with a pixel circuit PC5 and the vertical scanning circuit 24 is replaced with a vertical scanning circuit 25.

The pixel array 15 is configured with a pixel circuit PC5, a vertical signal line VSL, a storage capacitance line SCL, atop reset transistor MRST_T(x), and a bottom reset transistor MRST_B(x).

Figure 18:
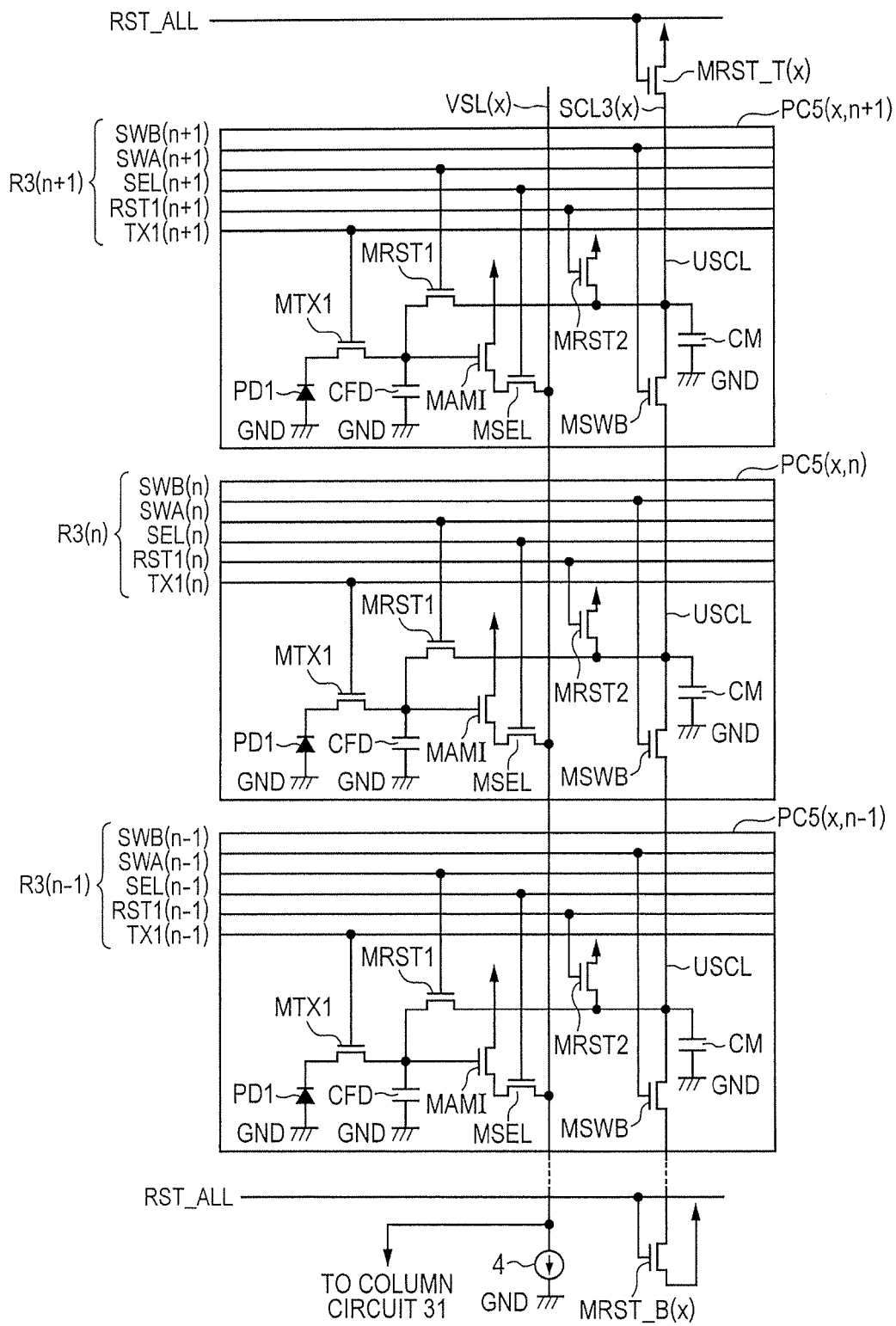
FIG. 18 is a circuit diagram illustrating the coupling relation of a pixel circuit, a top reset transistor, and a bottom reset transistor illustrated in FIG. 17.

FIG. 18 is a circuit diagram illustrating the coupling relation of the pixel circuit PC5, the top reset transistor MRST_T(x), and the bottom reset transistor MRST_B(x), illustrated in FIG. 17.

The pixel circuit PC5 corresponds, in configuration, to the pixel circuit PC3 illustrated in FIG. 15 in which the connection node of the drain of the reset transistor MRST1 is changed from one end of the floating diffusion capacitor CFD to the node at which one of the source and the drain of the first switching transistor MSWA and the source of the second switching transistor MSWB are coupled, and the symbol of the reset transistor MRST1 is changed to MRST2. Consequently, when resetting the floating diffusion capacitor CFD by the reset transistor MRST2, the first switching transistor MSWA is also set in a conductive state.

The number of transistors included in the pixel circuit PC5 and the pixel circuit PC3 is the same. However, the number of transistors coupled to the floating diffusion capacitor CFD is less by one in the pixel circuit PC5 than in the pixel circuit PC3. As a result, the floating diffusion capacitor CFD of the pixel circuit PC5 decreases, in comparison with the pixel circuit PC3, by the amount of the parasitic capacitance in the gate-source of the reset transistor MRST1; accordingly, the sensitivity at a low illuminance improves.

Figure 19:
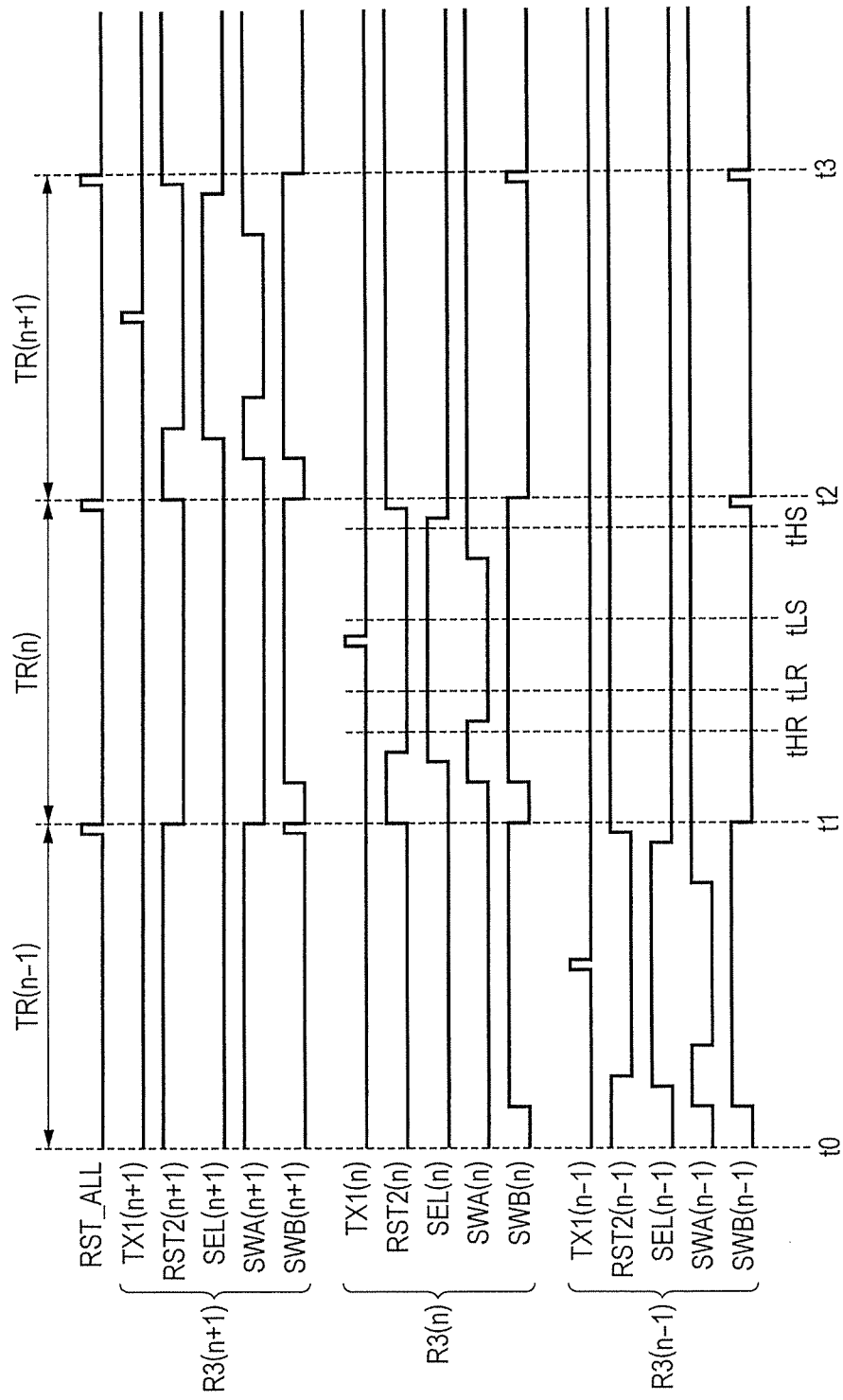
FIG. 19 is a timing chart explaining the read operation of the pixel circuit illustrated in FIG. 18.

FIG. 19 is a timing chart explaining the read operation of the pixel circuit PC5 illustrated in FIG. 18. The timing chart illustrated in FIG. 19 is different from the timing chart illustrated in FIG. 16 in the following points.

First, as illustrated in FIG. 16, when the read period TR(n) of the pixel circuit PC3(x, n) ends, the vertical scanning circuit 24 sets the reset transistor control signal RST1(n) at a high level, and resets the floating diffusion capacitor CFD by the reset transistor MRST1. At this time, it is necessary to set the first switching transistor MSWA in a non-conductive state, in order that the reset operation of the floating diffusion capacitor CFD may not be influenced by the potential fluctuation of the unit storage capacitance line USCL.

In contrast with this, as illustrated in FIG. 19, the vertical scanning circuit 25 maintains the high level of the first switching control signal SWA(n), in the next read period TR(n+1) and subsequent read periods after the end of the read period TR(n). This is for the reset transistor MRST2 to reset the floating diffusion capacitor CFD via the first switching transistor MSWA.

Next, when the second switching transistor MSWB and the unit storage capacitance line USCL are provided as in the pixel circuit PC5 illustrated in FIG. 18, it is not desirable that the second switching transistor MSWB resets the unit storage capacitance line USCL of the pixel circuit PC5(x, n) in a conductive state by the reset transistor MRST2. For example, as illustrated in FIG. 19, when reading the data of the pixel circuit PC(x, n) in the read period TR(n), the second switching transistor MSWB of the pixel circuit PC(x, n+1) is set in a conductive state. However, it is necessary to set the reset transistor MRST2 of the pixel circuit PC(x, n+1) in a non-conductive state. This is the reason why the reset control signal RST2(n+1) is set at a low level in the read period TR(n) in FIG. 19.

The effect of the imaging device 500 according to Embodiment 5 is as follows. The value of the floating diffusion capacitor CFD decreases, and the sensitivity at a low illuminance improves.

Embodiment 6

Figure 20:
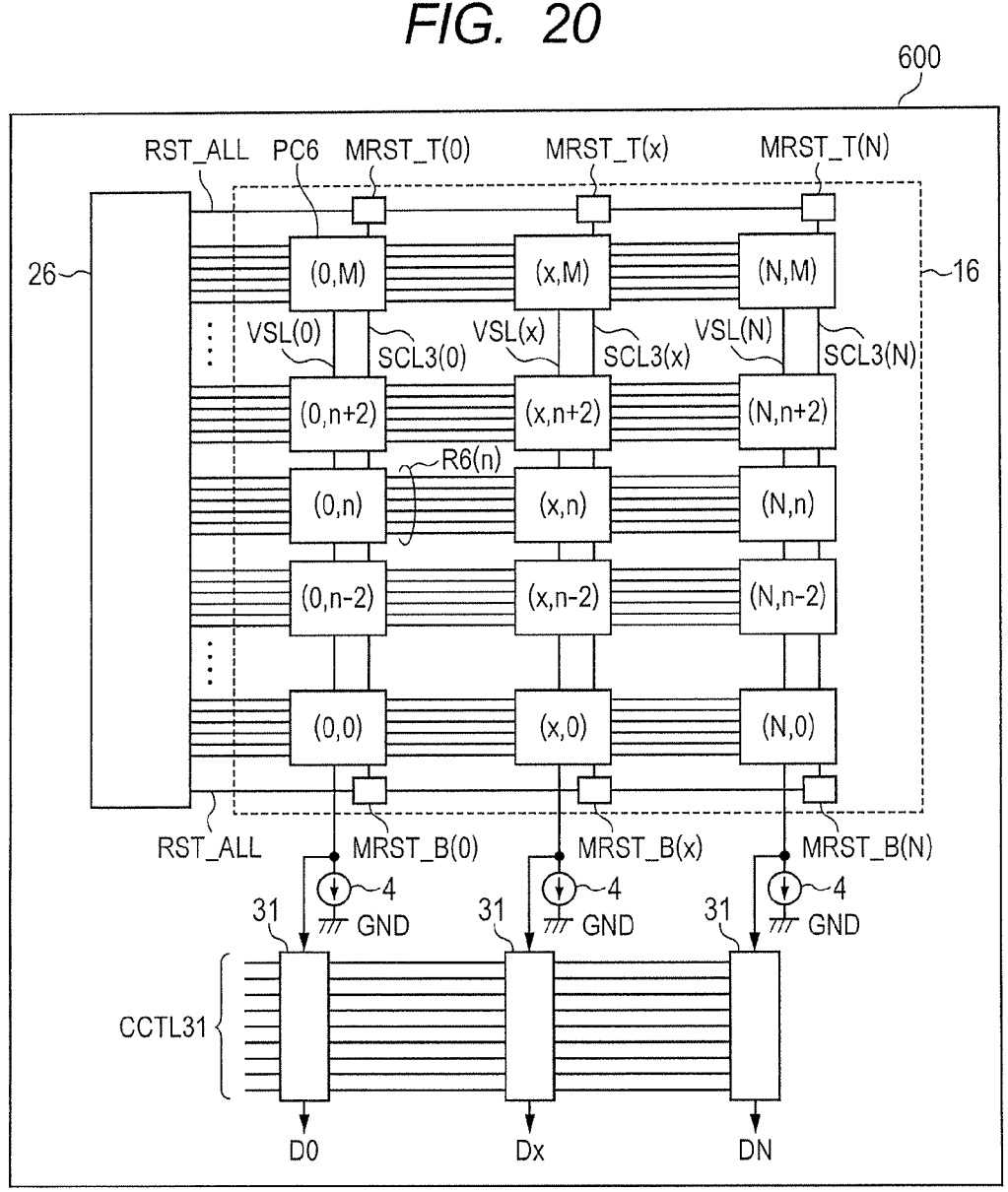
FIG. 20 is a block diagram illustrating a configuration of an imaging device according to Embodiment 6.

FIG. 20 is a block diagram illustrating a configuration of an imaging device 600 according to Embodiment 6.

In FIG. 20, an element to which the same symbol as in FIG. 14 is attached has the same configuration or the same function, and the duplicated explanation thereof will be omitted. The imaging device 600 illustrated in FIG. 20 corresponds, in configuration, to the imaging device 400 illustrated in FIG. 14 in which the pixel circuit PC3 is replaced with a pixel circuit PC6 and the vertical scanning circuit 24 is replaced with a vertical scanning circuit 26. The vertical scanning circuit 26 controls the operation of the pixel circuit PC6 arranged at the nth row by a row selection signal group R6(n).

The pixel array 16 is configured with a pixel circuit PC6, a vertical signal line VSL, a storage capacitance line SCL, a top reset transistor MRST_T(x), and a bottom reset transistor MRST_B(x) Differently from the pixel array provided in the imaging device according to other embodiments, the pixel array 16 is configured with the pixel circuits PC6 arranged in the shape of an array of (N+1) pieces in the row direction and (M+1)/2 pieces in the column direction. As will be described later, the pixel circuit PC6 is provided with two photoelectric conversion elements arranged in the column direction. Therefore, by arranging (M+1)/2 pieces of the pixel circuit PC6, M pieces of the photoelectric conversion elements are arranged in the column direction.

Figure 21:
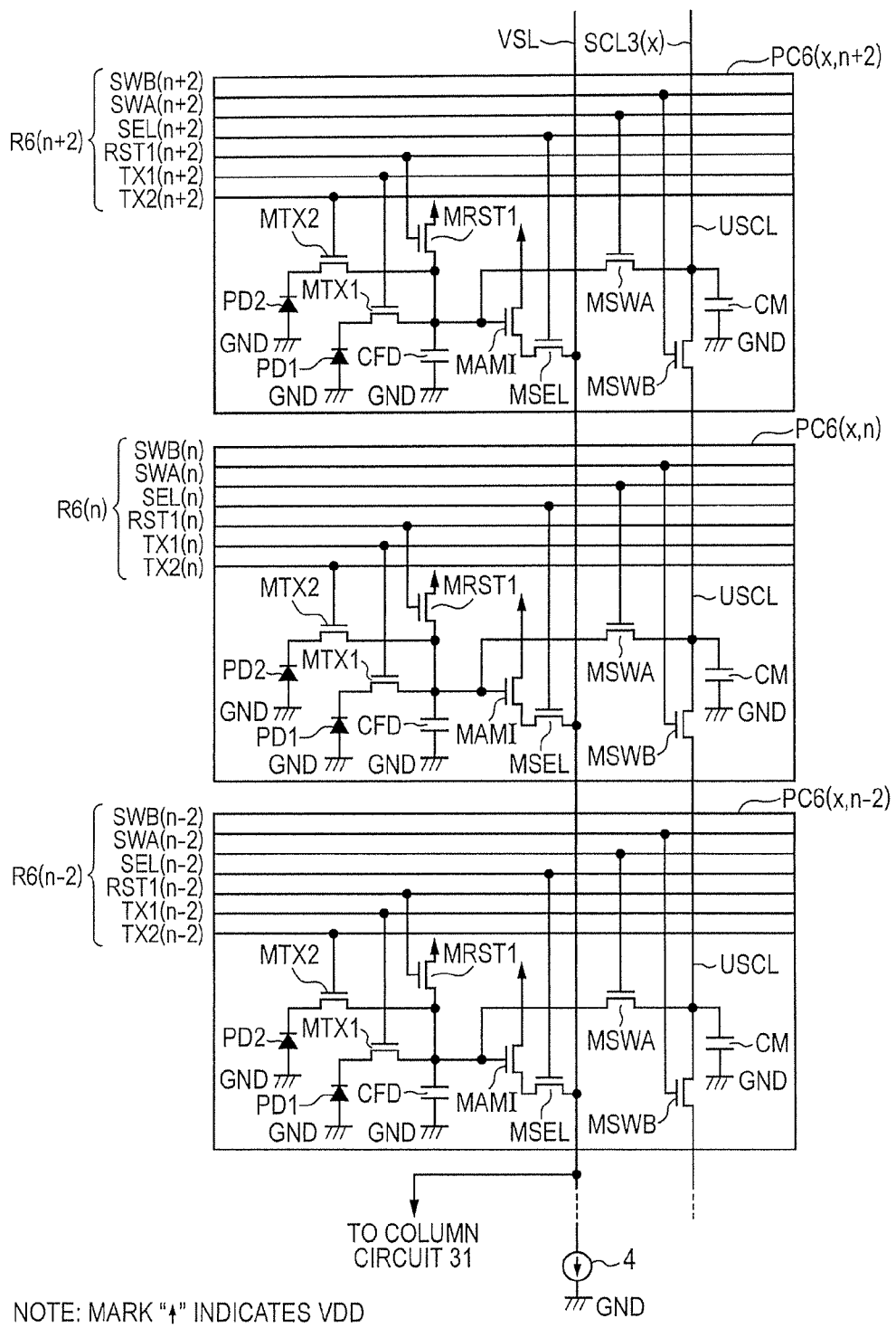
FIG. 21 is a circuit diagram of a pixel circuit illustrated in FIG. 20.

FIG. 21 is a circuit diagram of a pixel circuit PC6 illustrated in FIG. 20.

(Configuration) The pixel circuit PC6 corresponds, in configuration, to the pixel circuit PC3 illustrated in FIG. 12 in which a photoelectric conversion element PD2 and a transfer transistor MTX2 are added.

The pixel circuit PC6 is configured with photoelectric conversion elements PD1 and PD2, transfer transistors MTX1 and MTX2, a floating diffusion capacitor CFD, a reset transistor MRST1, an amplification transistor MAMI, a select transistor MSEL, a first switching transistor MSWA, a second switching transistor MSWB, and a storage line capacitance CM.

The power supply voltage GND is applied to an anode of each of the photoelectric conversion elements PD1 and PD2. A cathode of each of the photoelectric conversion elements PD1 and PD2 is coupled to one of a source and a drain of each of the transfer transistors MTX1 and MTX2, respectively. The other of the source and the drain of each of the transfer transistors MTX1 and MTX2 is coupled to one end of the floating diffusion capacitor CFD. The power supply voltage GND is applied to the other end of the floating diffusion capacitor CFD. A drain of the reset transistor MRST1 is coupled to the one end of the floating diffusion capacitor CFD. The power supply voltage VDD is applied to a source of the reset transistor MRST1.

The power supply voltage VDD is applied to a source of the amplification transistor MAMI and the voltage of the one end of the floating diffusion capacitor CFD is applied to a gate of the amplification transistor MAMI. A drain of the amplification transistor MAMI is coupled to a source of the select transistor MSEL, and a drain of the select transistor MSEL is coupled to the vertical signal line VSL. One of a source and a drain of the first switching transistor MSWA is coupled to the one end of the floating diffusion capacitor CFD. The other of the source and the drain of the first switching transistor MSWA is coupled to the unit storage capacitance line USCL. One end of the unit storage capacitance line USCL is coupled to a source of the second switching transistor MSWB, and the other end is coupled to a drain of a second switching transistor MSWB included in the pixel circuit PC6 arranged adjacently.

The storage line capacitor CM corresponds to the wiring capacitance of the unit storage capacitance line USCL. The unit storage capacitance line USCL corresponds to a portion of the storage capacitance line SCL(x) which is included in the pixel circuit PC6(x, n).

A transfer transistor control signal TX1, a transfer transistor control signal TX2, a reset transistor control signal RST1, a select transistor control signal SEL, a first switching control signal SWA, and a second switching control signal SWB are applied to the respective gates of the transfer transistor MTX1, the transfer transistor MTX2, the reset transistor MRST1, the select transistor MSEL, the first switching transistor MSWA, and the second switching transistor MSWB. The row selection signal group R6(n) is a bunch of these six control signals.

(Operation) The outline of operation of the pixel circuit PC6 controlled by the vertical scanning circuit 26 is as follows. In the following explanation, it is assumed that the storage line capacitor CM is the capacitor of three unit storage capacitance lines USCL (refer to Embodiment 3). When the pixel circuit PC6 arranged in the nth row is selected by the vertical scanning circuit 26, the floating diffusion capacitor CFD and the storage line capacitor CM coupled in parallel by the first switching transistor MSWA are reset by the reset transistor MRST1. The amplification transistor MAMI amplifies the voltage of the floating diffusion capacitor CFD, and based on the amplified voltage, the column circuit 31 generates a high-illuminance digital reset signal.

Subsequently, the floating diffusion capacitor CFD is separated from the storage line capacitor CM by the first switching transistor MSWA. The amplification transistor MAMI amplifies the voltage of the floating diffusion capacitor CFD, and based on the amplified voltage, the column circuit 31 outputs a low-illuminance digital reset signal.

Subsequently, the photo charge stored in the photoelectric conversion element PD1 is transferred to the floating diffusion capacitor CFD via the transfer transistor MTX1. A charge overflowing from the floating diffusion capacitor CFD is stored in the storage line capacitor CM. The amplification transistor MAMI amplifies the voltage of the floating diffusion capacitor CFD, and based on the amplified voltage, the column circuit 31 generates a low-illuminance digital signal.

Subsequently, the first switching transistor MSWA is set in a conductive state, and the floating diffusion capacitor CFD and the storage line capacitor CM are coupled in parallel. The amplification transistor MAMI amplifies the voltage of the floating diffusion capacitor CFD, and based on the amplified voltage, the column circuit 31 generates a high-illuminance digital signal.

When the generation of the high-illuminance digital reset signal, the low-illuminance digital reset signal, the low-illuminance digital signal, and the high-illuminance digital signal, based on the photo charge stored in the photoelectric conversion element PD1 is completed, the vertical scanning circuit 26 generates succeedingly each of the digital signals, based on the photo charge stored in the photoelectric conversion element PD2.

Figure 22:
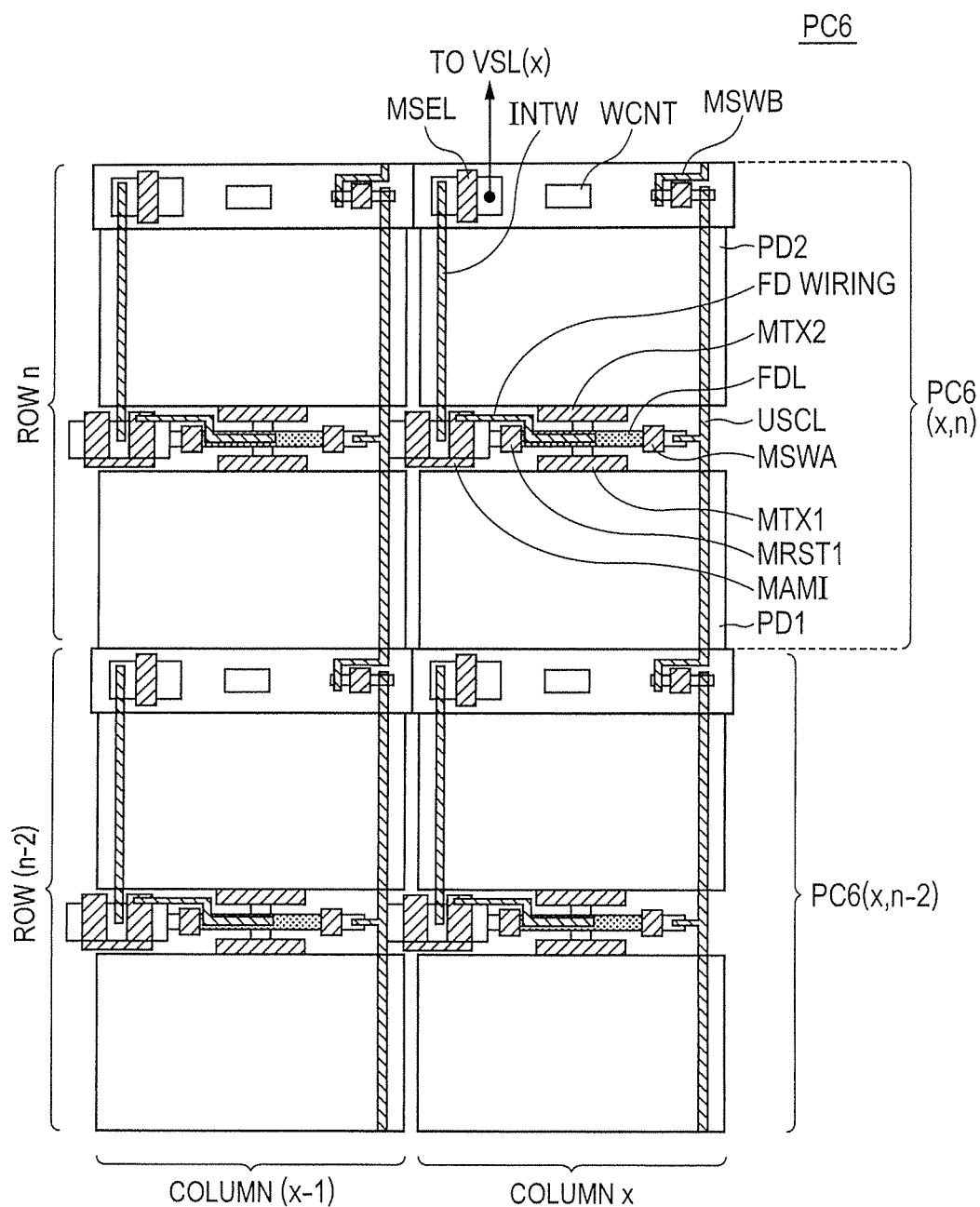
FIG. 22 is a layout pattern of a pixel circuit illustrated in FIG. 21.

FIG. 22 is a layout pattern of the pixel circuit PC6 illustrated in FIG. 21. FIG. 22 is the layout pattern of a total of four pixel circuits PC6, arranged at the (x−1)th column and the xth column of the nth row, and at the (x−1)th column and the xth column of the (n−2)th row. The arrangement of a transistor, etc. in the pixel circuit PC6(x, n) arranged at the upper right is explained among the four pixel circuits PC6, as an example.

(An intra-row area and an inter-row area) The photoelectric conversion element PD1 and the photoelectric conversion element PD2 are arranged in the column direction. The photoelectric conversion element PD1, for example, is a pn junction diode which is formed with an n-type impurity area formed in a p-well area of a semiconductor substrate, and a high-concentration p-type impurity region formed over the n-type impurity area (not shown). In the neighborhood of the photoelectric conversion element PD1 or the photoelectric conversion element PD2, a well contact WONT for supplying the power supply voltage GND to the p-well area is arranged.

In the area between the photoelectric conversion element PD1 and the photoelectric conversion element PD2 arranged in the same row (the area may be described as an "intra-row area" hereinafter), the transfer transistor MTX1, the transfer transistor MTX2, the floating diffusion FD, the reset transistor MRST1, the amplification transistor MAMI, the first switching transistor MSWA, and the floating diffusion wiring FDL are formed. On the other hand, in the area between the photoelectric conversion element PD1 and the photoelectric conversion element PD2 arranged at different rows (the area may be described as an "inter-row area" hereinafter), the select transistor MSEL, the second switching transistor MSWB, and the well contact WONT are arranged.

(Separate arrangement of the amplification transistor MAMI and the select transistor MSEL) In the pixel circuit PC6(x, n), the foiling region of the amplification transistor MAMI and the forming region of the select transistor MSEL are separated. The amplification transistor MAMI is arranged in the intra-row area and the select transistor MSEL is arranged in the inter-row area. The drain region of the amplification transistor MAMI and the source region of the select transistor MSEL are coupled by an intermediate connection line INTW. The drain of the select transistor MSEL is coupled to the vertical signal line VSL(x).

In the inter-row area adjoining the photoelectric conversion element PD2, the second switching transistor MSWB included in the pixel circuit PC6(x, n+2) is arranged. In the inter-row area adjoining the photoelectric conversion element PD1, the second switching transistor MSWB included in the pixel circuit PC6(x, n) is arranged. The wiring which couples both second switching transistors MSWB is the unit storage capacitance line USCL. The unit storage capacitance line USCL is coupled to one of the source and the drain of the first switching transistor MSWA. By separately arranging the forming region of the amplification transistor MAMI and the select transistor MSEL, it becomes possible to utilize effectively the intra-row area and the inter-row area.

(The configuration of the transfer transistors MTX1/MTX2) The gate electrodes of the transfer transistor MTX1 and the transfer transistor MTX2 are arranged in the intra-row area, respectively lying along the photoelectric conversion element PD1 and the photoelectric conversion element PD2 and facing with each other. Between the gate electrodes of the transfer transistor MTX1 and the transfer transistor MTX2, the source and drain region of both the transfer transistors are formed having a width narrower enough than the width of each gate electrode. As the result of having arranged the select transistor MSEL in the inter-row area, it becomes possible to set up more widely the gate width of the transfer transistor MTX1 and the transfer transistor MTX2 arranged in the intra-row area. Accordingly, the driving ability of the transfer transistor MTX1 and the transfer transistor MTX2 is strengthened, and the velocity to transfer the photo charge from the photoelectric conversion element PD1 and the photoelectric conversion element PD2 to the floating diffusion capacitor CFD is enhanced.

(The configuration of the floating diffusion) When arranged between the gate electrodes of the transfer transistor MTX1 and the transfer transistor MTX2, the width of the source and drain region of both the transfer transistors can be set as minimum necessary and smaller than the width of each gate electrode. On the other hand, the reset transistor MRST1 is arranged between the transfer transistors MTX1 and MTX2 and the amplification transistor MAMI. Sandwiching the transfer transistors MTX1 and MTX2, the first switching transistor MSWA is arranged on the opposite side of the reset transistor MRST1.

The drain region of the reset transistor MRST1 and one of the source and drain region of the first switching transistor MSWA are coupled to one of the source and drain region of the transfer transistor MTX1 and transfer transistor MTX2, by an impurity diffusion region set as the necessary minimum width. As a result, it is possible to suppress, to the minimum necessary value, the parasitic capacitance which stems from the source or drain region of the transfer transistor MTX1, the transfer transistor MTX2, the reset transistor MRST1, and the first switching transistor MSWA, and which is included in the floating diffusion capacitor CFD. As a result, it becomes possible to improve the sensitivity of the pixel circuit PC6 in the low illuminance side.

It should be understood by those skilled in the art that the embodiments disclosed in the present application are illustrative and not restrictive, with all the points of view. The scope of the present invention is illustrated not by the explanatory description given above but by the scope of the appended claims, and it is meant that various modifications and alterations may occur insofar as they are within the scope of the appended claims or the equivalents thereof.

What is claimed is:
1. An imaging device, comprising:
a plurality of pixel circuits arranged in the row direction and the column direction; and
a plurality of storage capacitance lines arranged in the row direction and extending in the column direction,
wherein the storage capacitance lines are coupled to the pixel circuits arranged in the same column,
wherein the pixel circuits each comprise:
a first photoelectric conversion element operable to store a charge generated by being subjected to light;
a floating diffusion to which the charge stored in the first photoelectric conversion element is transferred;
a first switching transistor operable to couple the floating diffusion and the storage capacitance line; and
a first reset transistor with a source coupled to a power supply line and a drain coupled to the storage capacitance line;
wherein the first reset transistor performs resetting to discharge a charge stored in at least one of the floating diffusion and the storage capacitance line,
wherein, in a selected row where a first pixel circuit, of the plurality of pixel circuits, with a select transistor set in a conductive state is arranged, the first switching transistor of the first pixel circuit is set in a conductive state,
wherein, in a non-selected row where a second pixel circuit, of the plurality of pixel circuits, with a select transistor set in a non-conductive state is arranged, the first switching transistor of the second pixel circuit is set in a non-conductive state, and
wherein the pixel circuit further comprises:
a second photoelectric conversion element operable to store a charge generated by being subjected to light;

a first transfer transistor operable to transfer a charge stored in the first photoelectric conversion element to the floating diffusion; and a second transfer transistor operable to transfer a charge stored in the second photoelectric conversion element to the floating diffusion.

2. An imaging device, comprising:

a plurality of pixel circuits arranged in the row direction and the column direction; and a plurality of storage capacitance lines arranged in the row direction and extending in the column direction, wherein the storage capacitance lines are coupled to the pixel circuits arranged in the same column, wherein the pixel circuits each comprise:

a first photoelectric conversion element operable to store a charge generated by being subjected to light;

a floating diffusion to which the charge stored in the first photoelectric conversion element is transferred;

a first switching transistor operable to couple the floating diffusion and the storage capacitance line; and a first reset transistor with a source coupled to a power supply line and a drain coupled to the storage capacitance line;

wherein the first reset transistor performs resetting to discharge a charge stored in at least one of the floating diffusion and the storage capacitance line, wherein, in a selected row where a first pixel circuit, of the plurality of pixel circuits, with a select transistor set in a conductive state is arranged, the first switching transistor of the first pixel circuit is set in a conductive state, wherein, in a non-selected row where a second pixel circuit, of the plurality of pixel circuits, with a select transistor set in a non-conductive state is arranged, the first switching transistor of the second pixel circuit is set in a non-conductive state, and wherein the storage capacitance line is configured with a plurality of unit storage capacitance lines arranged in the column direction, wherein the pixel circuit further comprises a second switching transistor, wherein the first switching transistor couples the floating diffusion to the unit storage capacitance line, and wherein the second switching transistor couples the unit storage capacitance lines in series.

3. The imaging device according to claim 1, wherein in the pixel circuit arranged at the selected row and in the pixel circuit arranged at the non-selected row adjoining the selected row, the second switching transistor is set in a conductive state.

4. The imaging device according to claim 1, further comprising a third reset transistor, wherein:

the third reset transistor is coupled to the unit storage capacitance line arranged at the end of the column direction, and performs resetting to discharge a charge stored in the unit storage capacitance lines arranged in the column direction.

5. An imaging device, comprising:

a plurality of pixel circuits arranged in the row direction and the column direction;

a plurality of storage capacitance lines arranged in the row direction and extending in the column direction; and a plurality of vertical signal lines arranged in the row direction and extending in the column direction, wherein the storage capacitance lines are coupled to the pixel circuits arranged in the same column, wherein the pixel circuits each comprise:

a first photoelectric conversion element operable to store a charge generated by being subjected to light;

a floating diffusion to which the charge stored in the first photoelectric conversion element is transferred;

a first switching transistor operable to couple the floating diffusion and the storage capacitance line;

a first reset transistor with a source coupled to a power supply line and a drain coupled to the storage capacitance line;

an amplification transistor operable to amplify and output a voltage of the floating diffusion; and a select transistor operable to couple the amplification transistor to the vertical signal line;

wherein the vertical signal line is coupled to the pixel circuits arranged in the same column, wherein to the vertical signal line, the amplification transistor:

outputs a high-illuminance reset noise by amplifying a voltage of the floating diffusion to which resetting has been performed together with the storage capacitance line;

outputs a low-illuminance reset noise by amplifying a voltage of the floating diffusion separated from the storage capacitance line after the resetting;

subsequently, outputs a low-illuminance mixed signal by amplifying a voltage of the floating diffusion to which a charge stored in the first photoelectric conversion element is transferred; and subsequently, outputs a high-illuminance mixed signal by amplifying a voltage of the floating diffusion coupled to the storage capacitance line.

6. The imaging device according to claim 5, further comprising:

a plurality of column circuits arranged in the row direction, wherein:

the column circuit is coupled to a vertical signal line arranged in the same column, and the column circuit outputs a high-illuminance digital reset signal by performing digital conversion to the high-illuminance reset noise outputted by the vertical signal line, the column circuit outputs a low-illuminance digital reset signal by performing digital conversion to the low-illuminance reset noise outputted by the vertical signal line, the column circuit outputs a low-illuminance digital signal by performing digital conversion to the low-illuminance mixed signal outputted by the vertical signal line, and the column circuit outputs a high-illuminance digital signal by performing digital conversion to the high-illuminance mixed signal outputted by the vertical signal line.

7. The imaging device according to claim 5, further comprising a plurality of first column circuits and a plurality of second column circuits, respectively arranged in the row direction, wherein the vertical signal line is coupled to the first column circuit and the second column circuit, each arranged in the same column, the first column circuit is provided with a first switch, a first amplifier, and a first analog-to-digital converter, the second column circuit is provided with a second switch, a second amplifier, and a second analog-to-digital converter, the first amplifier and the second amplifier amplify respectively the low-illuminance mixed signal and the high-illuminance mixed signal, both outputted by the vertical signal line, and output a low-illuminance signal level and a high-illuminance signal level, sequentially, and the first analog-to-digital converter and the second analog-to-digital converter convert in parallel the low-illuminance signal level and the high-illuminance signal level into a low-illuminance digital signal and a high-illuminance digital signal, respectively.

\* \* \* \* \*